US011261947B2

(12) United States Patent
Richardson et al.

(10) Patent No.: US 11,261,947 B2
(45) Date of Patent: Mar. 1, 2022

(54) APPARATUS TO CONVERT LINEAR MOTION TO ROTARY MOTION

(71) Applicants: John Richardson, Owosso, MI (US); Evan Collins, Ann Arbor, MI (US); Aaron Grigg, Bay City, MI (US)

(72) Inventors: John Richardson, Owosso, MI (US); Evan Collins, Ann Arbor, MI (US); Aaron Grigg, Bay City, MI (US)

(73) Assignee: EASTON HOLDINGS LLC, Largo, FL (US)

(*) Notice: Subject to any disclaimer, the term of this patent is extended or adjusted under 35 U.S.C. 154(b) by 0 days.

(21) Appl. No.: 16/501,938

(22) Filed: Jul. 8, 2019

(65) Prior Publication Data

US 2020/0340556 A1 Oct. 29, 2020

Related U.S. Application Data

(63) Continuation-in-part of application No. 15/237,513, filed on Aug. 15, 2016, now Pat. No. 10,344,671.

(51) Int. Cl.
*F02B 25/00* (2006.01)
*F16H 25/12* (2006.01)

(52) U.S. Cl.
CPC .................................. *F16H 25/12* (2013.01)

(58) Field of Classification Search
CPC ........ F02B 75/32; F02B 75/26; F02B 63/041; H02K 7/1884; H02K 35/02; H02K 35/04; F01B 3/04; F01B 9/06; F01B 3/06; F04B 9/047

USPC ........... 123/65 R, 45 R, 197.1, 56.1–56.9, 3; 290/1 A, 1 R
See application file for complete search history.

(56) References Cited

U.S. PATENT DOCUMENTS

| | | | | |
|---|---|---|---|---|
| 1,802,902 | A | * | 4/1931 | Brau ...................... F02B 75/28 123/56.8 |
| 4,462,345 | A | * | 7/1984 | Routery .................... F01B 3/04 123/197.4 |
| 5,442,913 | A | * | 8/1995 | Cho ........................ F02G 1/043 60/518 |
| 7,360,521 | B2 | * | 4/2008 | Raether .................... F01B 9/06 123/197.1 |
| 8,171,812 | B2 | * | 5/2012 | Raether ................... F16H 25/12 74/25 |
| 2004/0149122 | A1 | * | 8/2004 | Vaughan ................. F02B 75/32 92/31 |
| 2010/0236522 | A1 | * | 9/2010 | Page ....................... F04B 1/146 123/43 AA |

(Continued)

*Primary Examiner* — Long T Tran
*Assistant Examiner* — James J Kim
(74) *Attorney, Agent, or Firm* — Arthur W Fisher, III

(57) ABSTRACT

An apparatus to convert linear motion to rotary motion comprising a linear reciprocating member including a track drive member to be coupled to an input device and a rotatable track member including a track to be coupled to an output device wherein the track drive member is disposed to engage the track such that when the input device moves the linear reciprocating member back and forth the track drive member moves along the track rotating the rotatable track member to convert the linear motion imparted to the linear reciprocating member by the input device to the rotary motion of the rotatable track member to operate or drive the output device.

22 Claims, 21 Drawing Sheets

(56) References Cited

U.S. PATENT DOCUMENTS

2011/0011368 A1\* 1/2011 Raether .................. F16H 25/12
123/197.4

\* cited by examiner

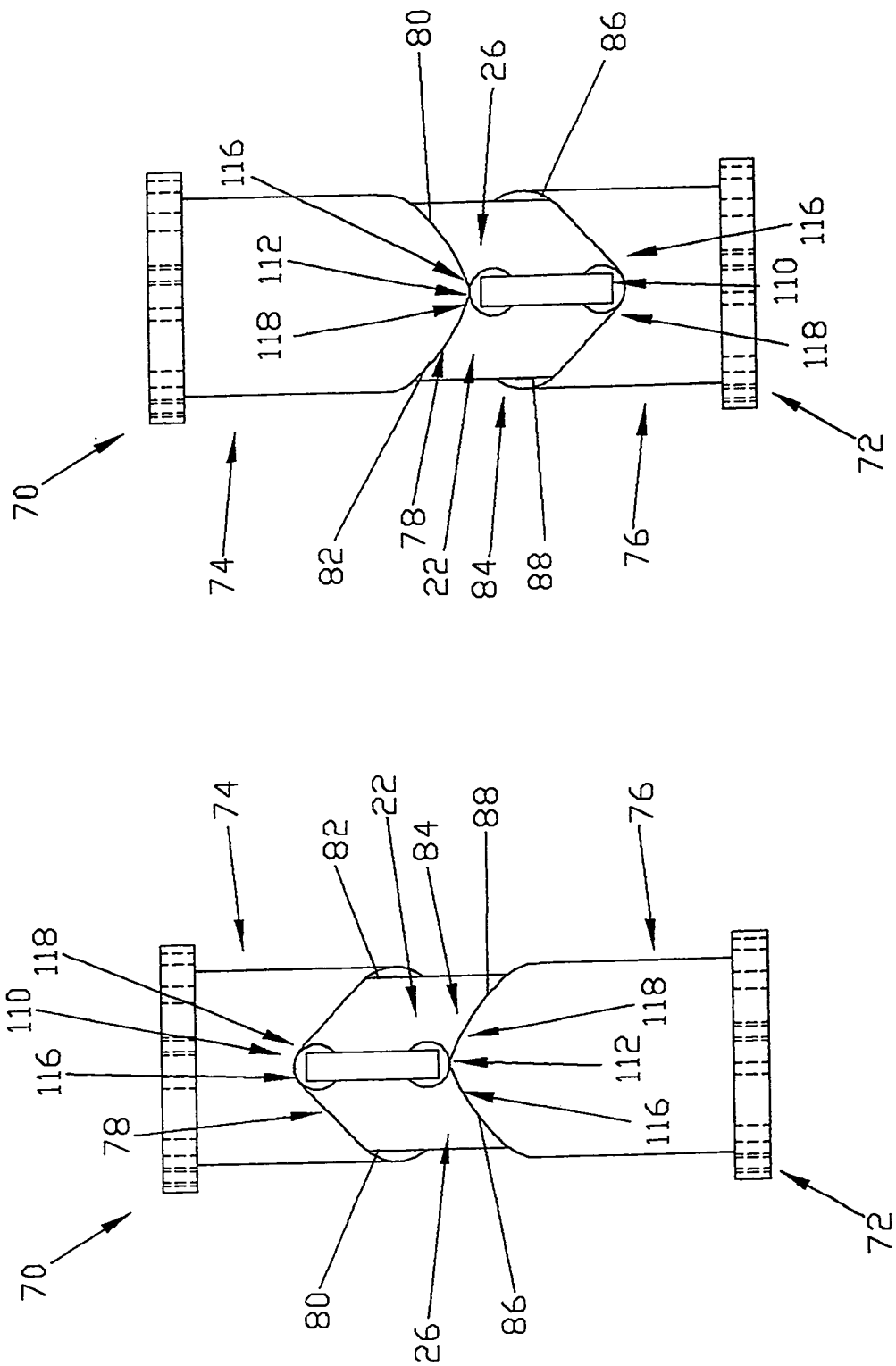

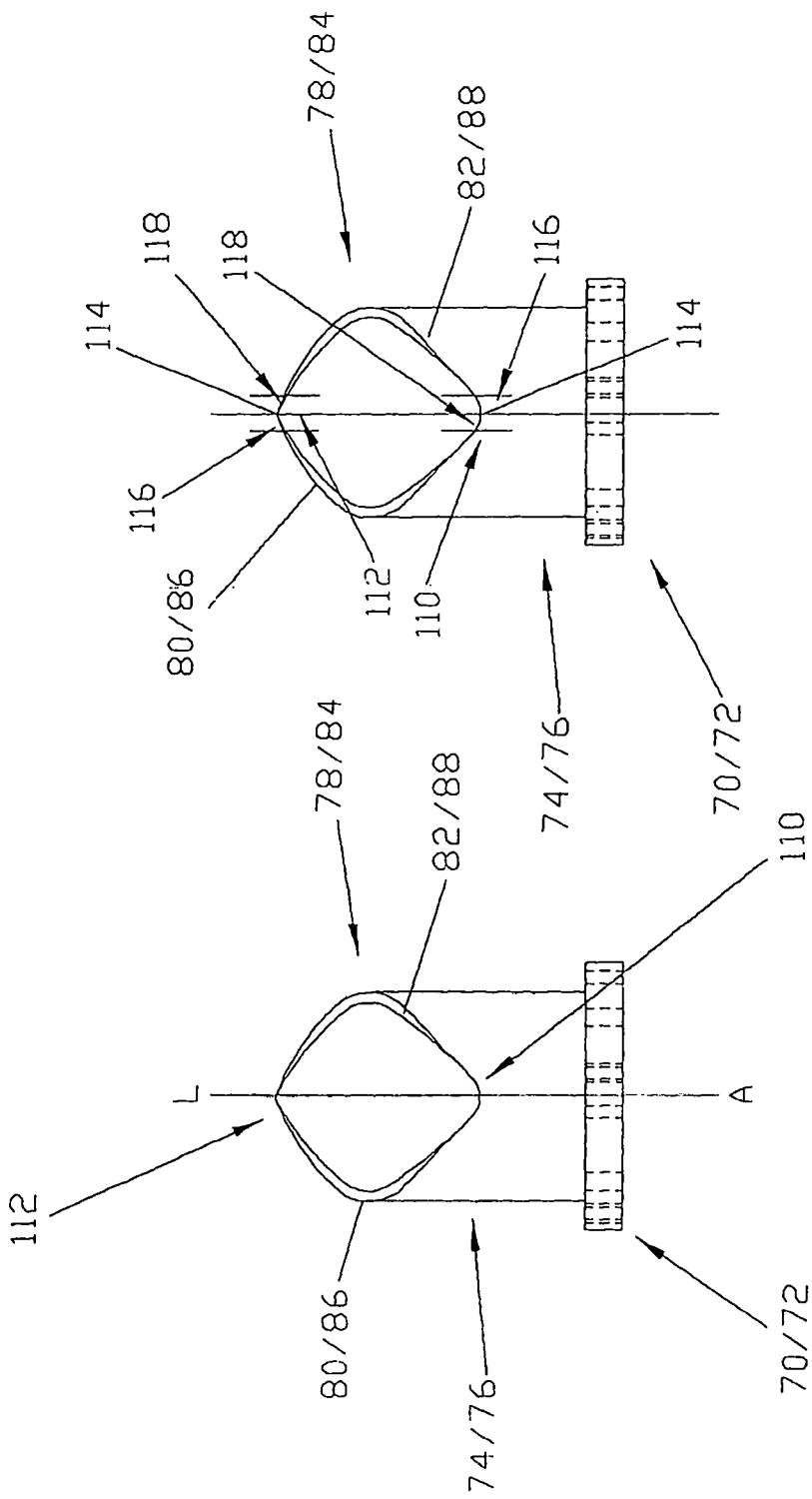

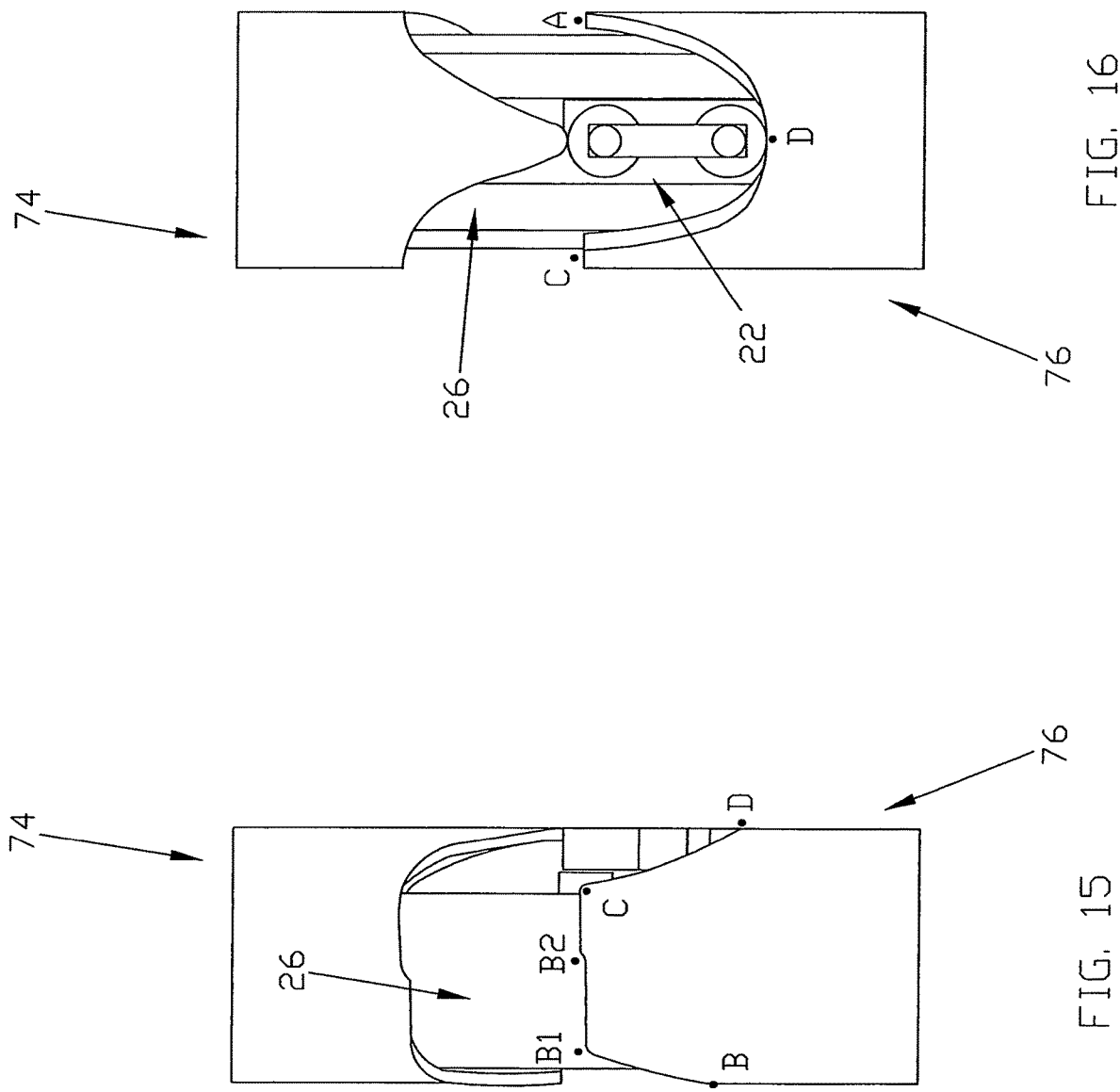

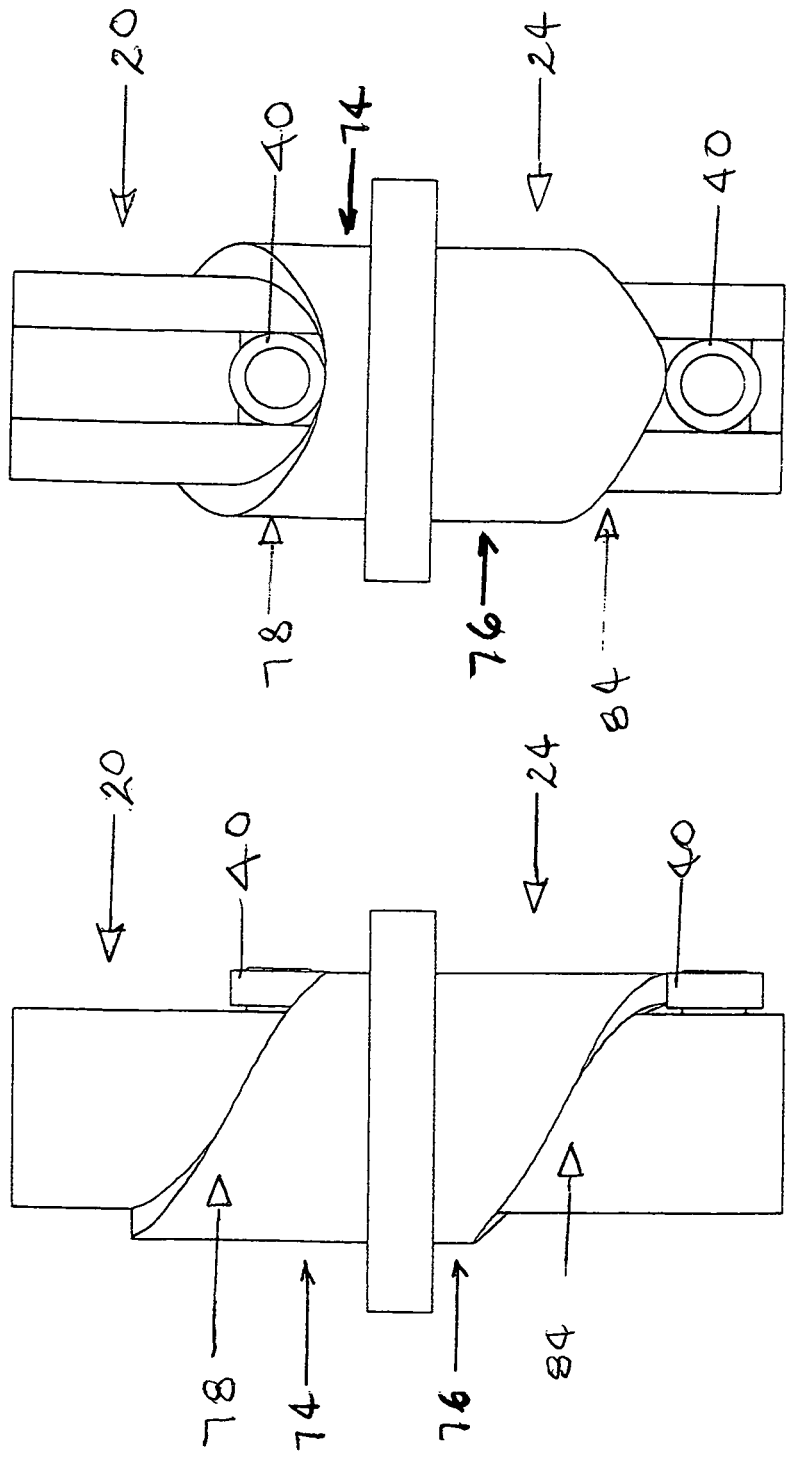

4 Stroke

| Stroke | HLX Diam | Ratio | Proximal (Top) Radius | Distal (Bottom) Radius | Roller Diam | Roller Spacing | Proximal Accel Angle | Distal Deccel | CL | |
|---|---|---|---|---|---|---|---|---|---|---|
| 1.77 | 6 | 0.295 | 0.51 | v | 1 | 1.25 | 10.7531 | v | 79.2468 | 89.9999 |
| 1.77 | 6 | 0.295 | 10 | v | 1 | 1.25 | 14.406 | v | 75.5939 | 89.9999 |
| 2.00 | 6 | 0.333 | 0.51 | 0.51 | 1 | 1.25 | 12.1159 | 12.1159 | 77.8840 | 89.9999 |
| 2.00 | 6 | 0.333 | 4 | 4 | 1 | 1.25 | 13.2467 | v | 76.7532 | 89.9999 |
| 2.00 | 6 | 0.333 | 10 | 10 | 1 | 1.25 | 19.5289 | v | 70.4710 | 89.9999 |
| 2.64 | 6 | 0.440 | 0.51 | v | 1 | 1.25 | 15.8632 | v | 74.1367 | 89.9999 |
| 2.64 | 6 | 0.440 | 8 | | 1 | 1.25 | 23.2932 | v | 66.7067 | 89.9999 |
| 3.15 | 6 | 0.525 | 0.51 | v | 1 | 1.25 | 18.7922 | v | 71.2077 | 89.9999 |
| 3.15 | 6 | 0.525 | 7.75 | v | 1 | 1.25 | 33.4616 | v | 56.5383 | 89.9999 |
| 1.77 | 2.7 | 0.656 | 0.51 | v | 1 | 1.25 | 23.7484 | v | 65.2515 | 88.9999 |
| 1.77 | 2.7 | 0.656 | 2.5 | v | 1 | 1.25 | 32.4525 | v | 57.5474 | 89.9999 |
| 24.00 | 12 | 2.000 | 0.51 | v | 1 | 1.25 | 52.606 | v | 37.3939 | 89.9999 |
| 12.00 | 6 | 2.000 | 0.51 | v | 1 | 1.25 | 53.4006 | v | 36.5993 | 89.9999 |
| 12.00 | 6 | 2.000 | 0.51 | v | 0.875 | 1 | 53.4006 | v | 36.5993 | 89.9999 |
| 12.00 | 6 | 2.000 | 0.51 | v | 0.875 | 3 | 53.4006 | v | 36.5993 | 89.9999 |
| 12.00 | 6 | 2.000 | 1.26 | v | 2.5 | 3 | 56.0334 | v | 33.9665 | 89.9999 |
| 24.00 | 12 | 2.000 | 4 | v | 1 | 1.25 | 59.204 | v | 30.7959 | 89.9999 |
| 12.00 | 6 | 2.000 | 4 | v | 1 | 1.25 | 74.3828 | v | 15.6171 | 89.9999 |
| 12.00 | 6 | 2.000 | 4 | v | 0.875 | 1 | 74.3828 | v | 15.6171 | 89.9999 |
| 12.00 | 6 | 2.000 | 4 | v | 2.5 | 3 | 74.3828 | v | 15.6171 | 89.9999 |
| 24.00 | 6 | 4.000 | 0.51 | v | 1 | 1.25 | 70.0536 | v | 19.9463 | 89.9999 |
| 24.00 | 6 | 4.000 | 3.5 | v | 1 | 1.25 | 82.1038 | v | 7.8961 | 89.9999 |
| | | #DIV/0! | | v | | | | v | 89.9999 | 89.9999 |
| | | #DIV/0! | | v | | | | v | 89.9999 | 89.9999 |
| | | #DIV/0! | | | | | | | | |

FIG. 26

| Single Cycle | | | | | | | | | | | | | |
|---|---|---|---|---|---|---|---|---|---|---|---|---|---|
| Stroke | HLX Diam | Ratio | Sharp Corner | BDC, 2 TDC, 2 BDC Radius | Comb Angle | Ex Angle | Intake Angle | Comp1 Angle | Comp 2 Angle | Exhaust Percent of diam | Intake Percent of diam | Compression Percent of diam | Final stage Compression (% of Stk) |
| 2.64 | 6 | 0.44 | Y | 0.51 | 45.9 | 60 | 60.4 | 34.47 | 75 | 0.25 | 0.25 | 0.35 | 0.5" |
| 2.64 | 6 | 0.44 | Y | 0.51 | 54.43 | 53.79 | 53.79 | 49.34 | 75 | 0.2 | 0.2 | 0.4 | 0.5" |
| 2.64 | 6 | 0.44 | Y | 1.5 | 47.84 | 45 | 45 | 48.81 | 75 | - | - | - | 10% |
| 6 | 6 | 1 | Y | 1.5 | 25 | 27.36 | 27.36 | 24.07 | 75 | - | - | - | 10% |
| 2.64 | 6 | 0.44 | Y | 4 | 48.86 | 23.59 | 23.59 | 35.25 | 75 | 0.2 | 0.2 | 0.4 | 0.5" |
| 1.77 | 2.7 | 0.655556 | Y | 0.51 | 41.77 | 39.4 | 39.4 | 34.07 | 75 | 0.2 | 0.2 | 0.4 | 10% |
| 1.77 | 2.7 | 0.655556 | Y | 1.5 | 36.69 | 20.08 | 20.08 | 23.38 | 75 | 0.2 | 0.2 | 0.4 | 10% |
| 3.15 | 4 | 0.7875 | Y | 0.51 | 37.15 | 35.55 | 35.55 | 28.34 | 75 | 0.2 | 0.2 | 0.4 | 10% |
| 3.15 | 4 | 0.7875 | Y | 2.4 | 30.03 | 7.17 | 7.17 | 13.72 | 75 | 0.2 | 0.2 | 0.4 | 10% |
| 24 | 12 | 2 | Y | 0.51 | 17.02 | 16.6 | 16.6 | 9.87 | 75 | 0.2 | 0.2 | 0.4 | 5% |
| 24 | 12 | 2 | Y | 4 | 13.97 | 9.86 | 9.86 | 5.87 | 75 | 0.2 | 0.2 | 0.4 | 5% |

FIG. 27

APPARATUS TO CONVERT LINEAR MOTION TO ROTARY MOTION

CROSS-REFERENCE

This nonprovisional application is a continuation-in-part application of co-pending nonprovisional application Ser. No. 15/237,513 filed Aug. 15, 2016.

BACKGROUND OF THE INVENTION

Field of the Invention

An apparatus to convert linear motion to rotary motion.

Description of the Prior Art

Devices such as engines or motors designed to convert reciprocal motion of rotational motion are well known in the art. Such prior art motors or engines typically include at least one cylinder in which a piston is disposed for reciprocal movement, a crankshaft having an axis of rotation generally perpendicular to the longitudinal axis of each cylinder and connecting rods pivotally connected to each piston and crankshaft to convert the linear movement of each piston to a rotational cranking force for rotating the crankshaft. Examples of the relevant prior art are discussed below.

U.S. Pat. No. 4,462,345 describes an energy transfer device including a rotatable drive shaft within a cylinder having a pair of pistons slidably mounted therein. The drive shaft has first and second helical tracks formed thereon extending in opposite rotational directions about the drive shaft. First and second ratcheted cam clutches are coupled to the first and second pistons, respectively, and engage the first and second tracks within the drive shaft for converting reciprocating motion of the pistons into rotational motion of the drive shaft.

U.S. Pat. No. 2,294,812 relates to an engine including an unitary elongated casing having a longitudinal axial chamber therein with a partition wall transversely dividing the chamber. A piston is disposed on one side of the partition and a reciprocating element is disposed on the other side of the partition. Means extends through the partition to transmit reciprocating motion of the piston to the reciprocating element with a drive shaft journaled in the casing and held against axial movement in the adjacent end of the casing. Another means in the casing connects the reciprocating element and shaft so as to convert the reciprocating motion of the element into rotating motion of the shaft.

U.S. Pat. No. 4,776,304 discloses a motion converter for use in a combustion engine or air compressor wherein reciprocating motion of a piston is converted into rotational motion of an output shaft or a rotational motion of an input shaft is converted to a reciprocating motion of the piston. The motion converter provides increased mechanical efficiency. Specifically, the motion converter comprises a crosswise disposition of four cylinders and the interactive use of links together with a crank for converting the resulting swinging motion to rotational motion so that all the vibration, including the primary vibration and the secondary vibration are dissolved by means of an interactive offset. If rotary motion is imparted to the crank shaft, it is transferred to a perpendicular connecting bearing and a crank pin to impart a back and forth rotation to the links to reciprocate the pistons for compressing a gas disposed within the cylinders. Conversely, if reciprocating motion is imparted to the pistons, a back and forth motion is imparted to the links to rotate a rotatable shaft and a yoke connected to the perpendicular connecting bearing to rotate the crank shaft.

U.S. Pat. No. 5,203,295 describes a multi-cylinder internal combustion engine including a plurality of reciprocating pistons each having a piston rod connected to a ball cage arrangement to convert reciprocating motion of the piston rod into rotation of a shaft coaxial with the piston rod. A parallelogram linkage connects the piston assemblies to move the piston assemblies in concert through the cycles of the engine.

U.S. Pat. No. 3,991,736 shows two reciprocating pistons in opposite cylinders connected by a shaft to drive a flywheel that, in turn, drives a second device.

U.S. Pat. No. 4,641,611 discloses an oscillatory motion apparatus including a first reciprocating rod oriented generally perpendicularly to a second reciprocating rod. A first trammel gear is pivotally secured to the first and second reciprocating rods. Movement of the reciprocating rods rotates the trammel gear. An output gear may then rotate in response to rotation of the trammel gear. The invention comprises an engine block with two or more pairs of opposed cylinders each containing pistons configured for reciprocal motion therein. The rods, which may be connecting rods, connect pairs of opposed pistons. The connecting rods are rotatably connected to the trammel gear. Movement of the pistons results in rotation of the trammel gear operatively associated with an output gear to produce rotary output.

While some of the prior art may contain some similarities relating to the present invention, none teach, suggested or include all of the advantages and unique features of the invention disclosed hereafter.

SUMMARY OF THE INVENTION

The present invention relates to an apparatus to convert linear motion to rotary motion comprising an apparatus coupled between an input device such as a reciprocating engine and an output device such as an electric generator.

The apparatus includes a linear reciprocating member having a track drive member extending outwardly therefrom and a rotatable track member having a track operatively positioned or disposed relative to each other on a frame.

The track of the rotatable track member comprises a pair of substantially parallel track surfaces to operatively the track drive member to rotate the rotatable track member as the linear reciprocating member is cycled back and forth in a substantially straight path by the input device.

In addition, the track may include a pair of transition zones comprising a center point at which the linear reciprocating member changes direction during operation of the apparatus dividing each transition zone into an exit transition track segment and an entry transition track segment where the velocity of the linear reciprocating member increases (accelerates) when entering the exit track transition segment of the corresponding track transition zone and the velocity of the linear reciprocating member decreases (deceleration) when entering the exit transition track segment of the corresponding track transition zone.

To assemble the apparatus, the linear reciprocating member is coupled to an input device capable of moving the linear reciprocating member back and forth in a substantially straight path direction and the rotatable track member is coupled to an output device to generate a rotary output.

When so assembled, the track drive member engages the track surfaces as the linear reciprocating member moves back and forth converting the reciprocating linear motion of the input device to the rotary motion of the output device.

This Summary is not intended to describe essential features of the claimed subject matter nor is it intended to limit the scope of the claimed subject matter. To the contrary, this Summary merely outlines various concepts and features that are developed in the Detailed Description.

DESCRIPTION OF THE DRAWINGS

For a fuller understanding of the nature and object of the invention, reference should be had to the following detailed description taken in connection with the accompanying drawings in which:

FIG. 3 is a partial side view of the track drive member and rotatable track member of the present invention in a first position.

FIG. 4 is a partial side view of the track drive member and rotatable track member of the present invention shown in FIG. 3 rotated 180°.

FIG. 5 is a view of the first or proximal track member or portion or second distal track member or portion of the rotatable track member of the present invention.

FIG. 6 is a view of the first or proximal track member or portion or second or distal track member or portion depicting the transition zones of the first track portion or second track portion of the present invention.

FIG. 15 is a side view of the track drive member and rotatable track member of the alternate embodiment of the present invention graphically depicted in FIG. 14 in a first position.

FIG. 16 is a side view of the track drive member and rotatable track member of the alternate embodiment of the present invention graphically depicted in FIG. 14 rotated 90°.

FIG. 19 is a partial side view of the track drive member and rotatable track member of another embodiment of the present invention in a first position.

FIG. 20 is a partial side view of the track drive member and rotatable track member of the embodiment of the present invention depicted in FIG. 19 rotated 90°.

FIG. 26 is a chart of various dimensions and relationships of components of the present invention.

FIG. 27 is another chart of various dimensions and relationships of components for the alternate embodiment of the present invention shown in FIGS. 14 through 18.

Similar reference characters refer to similar parts throughout the several views of the drawings.

DETAILED DESCRIPTION OF THE INVENTION

The present invention relates to an apparatus comprising a linear reciprocating member including a track drive member and a rotatable track member including a track wherein the track drive member is disposed to engage the track to rotate the rotatable track member as the track drive member reciprocates linearly to convert linear motion into rotary motion.

Figure 1:
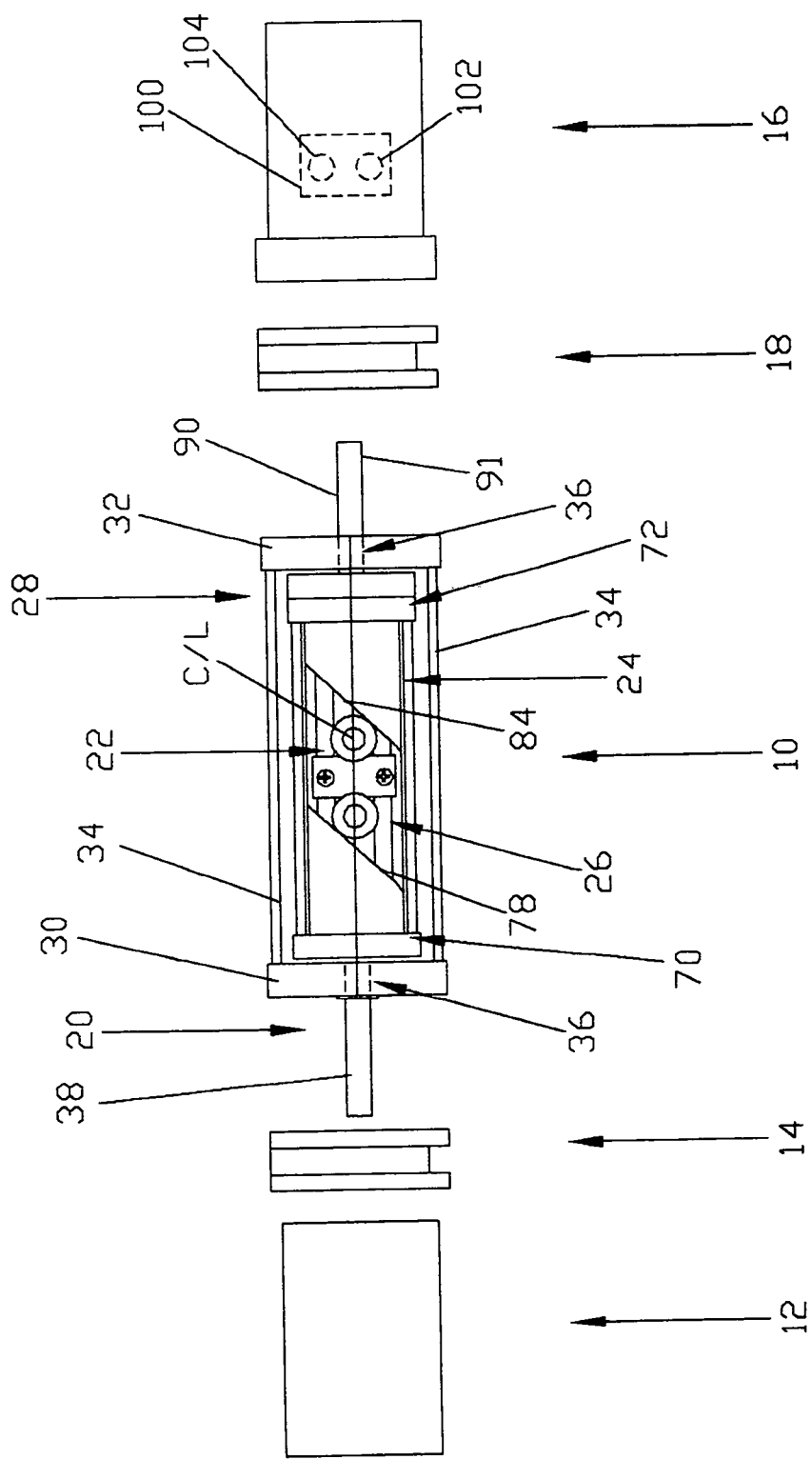
FIG. 1 is a side view of the apparatus of the present invention.

As shown in FIG. 1, the apparatus generally indicated as 10 is coupled to an input device generally indicated as 12 through a timing module generally indicated as 14 and coupled to an output device generally indicated as 16 through a starter module generally indicated as 18.

The input device 12 imparts a reciprocating motion to a linear reciprocating member or shaft generally indicated as 20. The input device 12 may, for example, comprise an internal combustion engine as disclosed in co-pending application Ser. No. 15/237,513 and incorporated herein by reference. Of course, the input device 12 may comprise a hydraulic device, pneumatic device or similar device.

The rotatable track member generally indicated as 24 imparts a rotary motion to the output device 16. For example, the output device 16 may comprise an electric generator or power source 100 such as a rotor 102 and stator 104 driven by the apparatus 10. Of course, the rotatable output drive or shaft 90 may be coupled to a gear assembly, pulley arrangement or other electrical or mechanical device.

As shown in FIG. 1, the apparatus 10 comprises the linear reciprocating member or shaft 20 having a track drive member generally indicated as 22 secured to and extending outwardly therefrom and the rotatable track member generally indicated as 24 having the track generally indicated as 26 formed therein operatively positioned relative to each other on a frame generally indicated as 28.

The frame comprises a first or proximal end plate 30 and second or distal end plate 32 held in spaced relationship relative to each other by at least one stanchion or post 34. Each end plate 30 and 32 includes a central disposed aperture or hole 36 formed therethrough.

An outer proximal end portion 38 of the linear reciprocating member or shaft 20 extends through the central disposed hole 36 formed through the first or proximal end plate 30 and timing device 14 and then coupled to the input device 12. The outer distal end portion 91 of the rotary shaft 90 extends through the centrally disposed aperture or hole 36 formed through the second or distal end plate 32 and starter unit 18 and then coupled to the output device 18.

Figure 2:
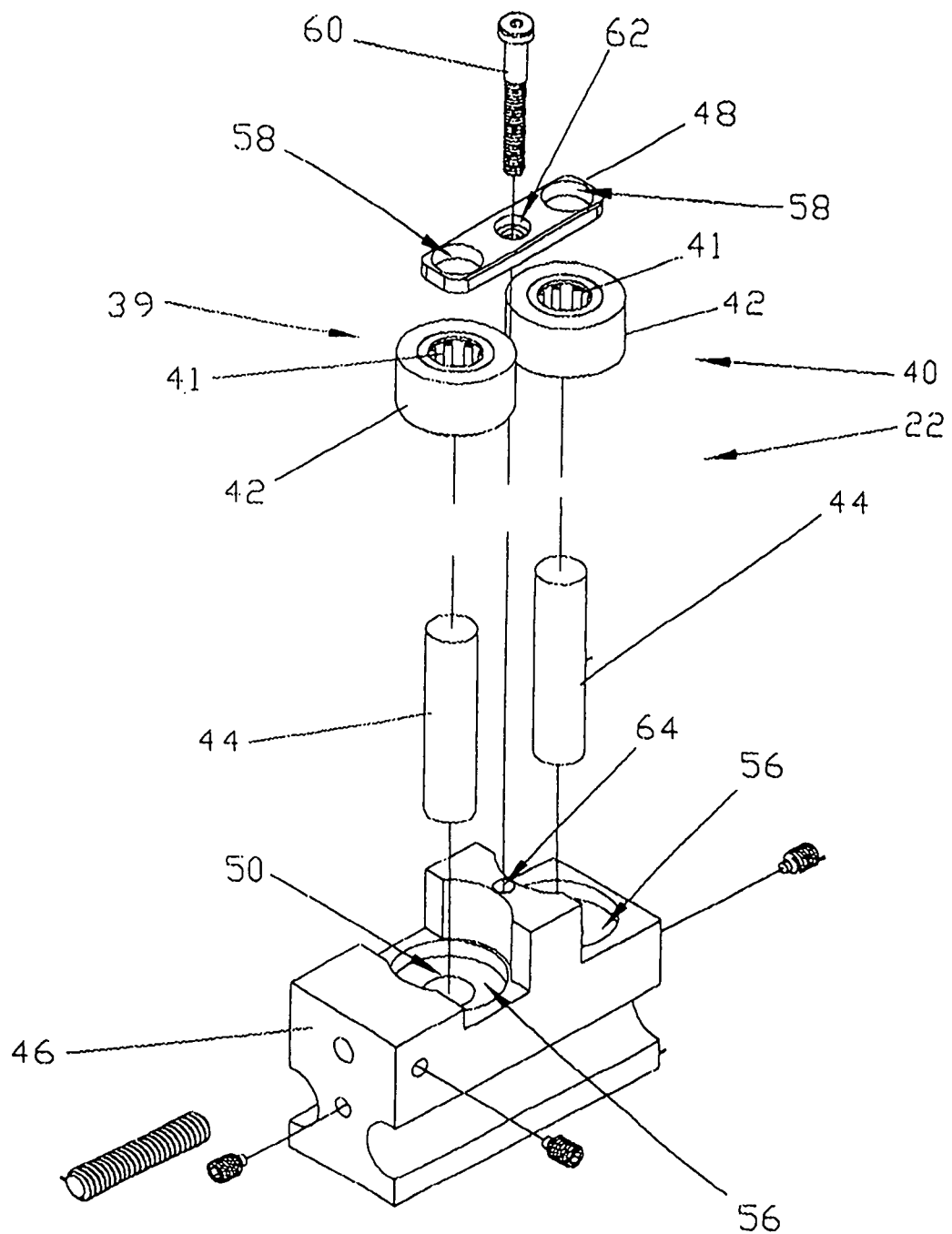
FIG. 2 is a perspective exploded view of the track drive member of the present invention.

As shown in FIG. 2, the track drive member 22 comprises a pair of counter-rotating members or bearings disposed to engage opposite sides of the track 26. Specifically, the pair of counter-rotating members or bearings comprises a first substantially round or circular member and a second substantially round or circular member each generally indicated as 40 and each including a circular or round passage 41 formed therethrough and each having a substantially flat circumference or outer surface 42 rotatably mounted on a corresponding substantially cylindrical post 44 extending between an assembly mounting block 46 and a retention bar or plate 48.

The lower portion of each substantially cylindrical post 44 is secured within a corresponding hole 50 and a corresponding recess 56 formed in the assembly mounting block 46 to support the corresponding substantially round or circular member 40 on the assembly mounting block 46. The upper portion of each substantially cylindrical post 44 extends through the corresponding substantially round or circular hole 41 formed through the substantially round or circular member 40 and a circular or round aperture 58 formed through the retention bar or plate 48. The counter-rotating members or bearings 40 are secured between the mounting block assembly 46 and the retention bar or plate 48 by a fastener 60 extending through an aperture 62 formed through the retention bar or plate 48 and into a hole or channel 64 formed in the assembly mounting block 46.

Each counter-rotating member or bearing 40 rotates or spins in a single direction even as the linear reciprocating member or shaft 20 changes direction at the end of each linear stoke between the proximal and distal end portions of the apparatus 10.

Alternatively, the track drive member 22 may comprise a single rotating member or bearing 40 that changes the direction of rotation when the linear reciprocating member or shaft 20 reverses direction.

As shown in FIGS. 1 and 3 through 5, the rotatable track member 24 is rotatably mounted on the frame 28 by a first or proximal bearing assembly generally indicated as 70 and a second or distal bearing assembly generally indicated as 72. The rotatable track member 24 may comprise a first or proximal track member or portion 74 and a second or distal track member or portion 76 coupled to the first bearing assembly 70 and the second or distal bearing assembly 72 respectively to cooperatively form the track 26 therebetween. Thus the track 26 comprises a slot having a first track section generally indicated as 78 including a substantially flat first track surface 80 and a substantially flat second track surface 82 formed on the first or proximal track member or portion 74 and a second track section generally indicated as 84 including a substantially flat first track surface 86 and a substantially flat second track surface 88 formed on the second or distal track member or portion 76. The substantially flat circumference or outer surface 42 of each counter-rotating member or bearing 40 engages the corresponding substantially flat track surfaces 80, 82, 84 or 86 to rotate the rotatable track member 24 as the linear reciprocating member or shaft 20 is cycled linearly between the proximal end portion and distal end portion of the apparatus 10 by the input device 12.

The substantially flat first track surface 80 of the first track section 78 formed on the first track or proximal portion 74 and the substantially flat first track surface 86 of the second track section 84 formed on the second track portion 76 are substantially parallel. Similarly, the substantially flat second track surface 82 of the first track section 78 formed on the first or proximal track portion 74 and the substantially flat second track surface 88 of the second or distal track portion 76 are substantially parallel.

The track 26 includes a pair of transition zones. In particular, as shown in FIGS. 3 through 6, a first or substantially concave first transition zone 110 and a second or substantially convex transition zone 112 are formed between opposite ends of the first track surface 80 and the second track surface 82 of the first track section 78 of the first or proximal portion 74 of the rotatable track member 22 and opposite ends of the second track surface 86 and the second track surface 88 of the second track section 84 of the second or distal portion 76 of the rotatable track member 22 respectively.

The first or substantially concave track transition zone 110 and the second or substantially convex track transition zone 112 each comprises a center point 114 at which the linear reciprocating member or shaft 20 changes direction during operation of the apparatus 10 dividing the first or concave track transition zone 110 and the second or substantially convex transition zone 112 into an exit transition track segment 116 and an entry transition track segment 118 where the velocity of the linear reciprocating member or shaft 20 increases (accelerates) when entering the first track section 78 or the second track section 84 from the corresponding exit track transition segment 116 and the velocity decreases (decelerates) when entering the entry track transition segment 118 of the corresponding track transition zone 110 or 112. When the track drive member 22 is in the first track section 78 and the second track section 84 between the first or concave track transition zone 110 and the corresponding second or convex track transition zone 112, the velocity of the linear reciprocating member or shaft 20 is substantially constant.

When assembled, the first or concave track transition zone 110 of the first or proximal track member or portion 74 is adjacent the second or convex track transition zone 112 of the second or distal track member or portion 76 and the second or convex track transition zone 112 of the first or proximal track member or portion 74 is adjacent the first or concave track transition zone 110 of the second distal track member or portion 76 where the center point 114 of corresponding first or substantially concave track transition zone 110 and the second or substantially convex track transition zone 112 are axially aligned relative to each other along the longitudinal axis LA of the rotatable track member 22.

When assembled, the ratios of the linear stroke length or travel distance of the linear reciprocating member of shaft 20 from one end of the apparatus 10 to the other to the outside diameter of the rotatable track member or substantially cylindrical rotatable sleeve 24 of the constant velocity portion of the track 26 are set forth in Table 1 below. The ratios and degrees are approximate values and can otherwise be expressed "about". For example, for a linear stroke length to rotatable track member outside diameter ratio of between about 0.3 to about 0.6 the constant velocity portion of the track 26 from about 80° to about 45°.

TABLE I

| Center Line Angle | | | |
| --- | --- | --- | --- |
| Stroke to Helix Diameter Ratio | | Range (Degrees) | |
| 0.3 | 0.6 | 80 | 45 |
| 0.6 | 1 | 70 | 25 |
| 1 | 1.5 | 60 | 10 |
| 1.5 | 2 | 46 | 8 |
| 2 | 3 | 37 | 7 |
| 3 | 4 | 27 | 7 |

Although reference is made to a constant velocity portion of the track 24, shaft of the track 24 may be configured to produce a constantly changing rotational velocity.

Figure 7:
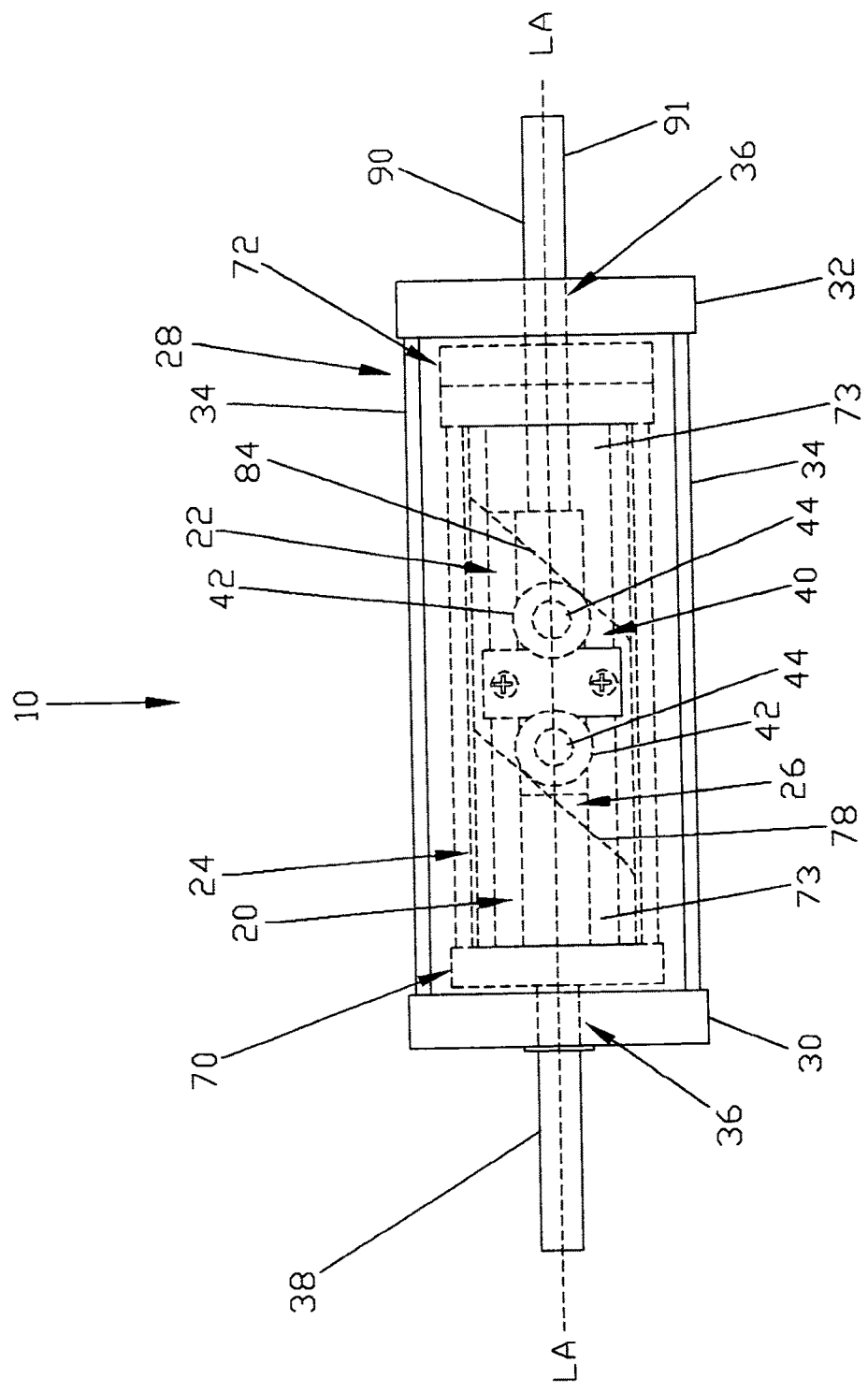
FIG. 7 is an alternate embodiment of the apparatus of the present invention.

An alternate embodiment of the apparatus 10 shown in FIG. 7 is similar to the apparatus 10 depicted in FIG. 1 except that the track drive member 22 is disposed within the rotatable track member or substantially cylindrical rotatable sleeve 24 having the track 26 formed on or in the interior surface thereof. In describing this alternate embodiment of the apparatus 10 structural elements similar to those of apparatus 10 of FIG. 1 are similarly designated.

Specifically, as shown in FIG. 7, the apparatus 10 comprises the linear reciprocating member or shaft 20 having a track drive member generally indicated as 22 secured to and extending outwardly therefrom and the rotatable track member generally indicated as 24 having the track generally indicated as 26 formed in the interior surface thereof operatively positioned relative to each other on a frame generally indicated as 28.

The frame comprises a first or proximal end plate 30 and second or distal end plate 32 held in spaced relationship relative to each other by at least one stanchion or post 34. Each end plate 30 and 32 includes a central disposed aperture or hole 36 formed therethrough.

The outer end portion 38 of the linear reciprocating member or shaft 20 extends through the central disposed hole 36 formed through the first or proximal end plate 30 and timing device 14 and then coupled to the input device 12. The outer end portion 91 of the rotary shaft 90 extends through the centrally disposed aperture or hole 36 formed through the second or distal end plate 32 and starter unit 18 and then coupled to the output device 18.

As shown in FIG. 7, the track drive member 22 comprises a pair of counter-rotating members or bearings disposed to engage opposite sides of the track 26. Specifically, the pair of counter-rotating members or bearings comprises a first substantially round or circular member and a second substantially round or circular member each indicated as 40 and each including a circular or round passage 41 formed therethrough and each having a substantially flat circumference or outer surface 42 rotatably mounted on a corresponding substantially cylindrical post 44 extending between an assembly mounting block 46 and a retention bar or plate 48.

The lower portion of each substantially cylindrical post 44 is secured within a corresponding hole 50 and a corresponding recess 56 formed in the assembly mounting block 46 to support the corresponding substantially round or circular member 40 on the assembly mounting block 46. The upper portion of each substantially cylindrical post 44 extends through the corresponding substantially round or circular hole 41 formed through the substantially round or circular member 40 and a circular or round aperture 58 formed through the retention bar or plate 48. The counter-rotating members or bearings 40 are secured between mounting block 46 and the retention bar or plate 48 by a fastener 60 extending through an aperture 62 formed through the retention bar or plate 48 and into a hole or channel 64 formed in the assembly mounting block 46.

Each counter-rotating member or bearing 40 rotates or spins in a single direction even as the linear reciprocating member or shaft 20 changes direction at the end of each linear stoke between the proximal and distal end portions of the apparatus 10.

Alternatively, the track drive member 22 may comprise a single rotating member or bearing 40 that changes the direction of rotation when the linear reciprocating member or shaft 20 reverses direction.

The rotatable track member 24 is rotatably mounted on the frame 28 by a first or proximal bearing assembly generally indicated as 70 and a second or distal bearing assembly generally indicated as 72. The rotatable track member 24 comprises a substantially cylindrical sleeve 73 coupled to the first bearing assembly 70 and the second or distal bearing assembly 72. The track 26 comprises a groove formed on the interior surface of the substantially cylindrical sleeve 73 having a first track section generally indicated as 78 including a substantially flat first track surface 80 and a substantially flat second track surface 82 formed on the first track member or portion 74 and a second track section generally indicated as 84 including a substantially flat first track surface 86 and a substantially flat second track surface 88 formed on the second track portion 76. The substantially flat circumference or outer surface 42 of each counter-rotating member or bearing 40 engages the corresponding substantially flat track surfaces 80, 82, 84 or 86 to rotate the rotatable track member 24 as the linear reciprocating member or shaft 20 is cycled linearly between the proximal end portion and distal end portion of the apparatus 10 by the input device 12 as in the first embodiment.

The first track surface 80 of the first track section 78 formed on the first track or proximal portion 74 and the first track surface 86 of the second track section 84 formed on the second track portion 76 are substantially parallel. Similarly, the second track surface 82 of the first track section 78 formed on the first or proximal track portion 74 and the second track surface 88 of the second or distal track portion 76 are substantially parallel as in the first embodiment.

Figure 23:
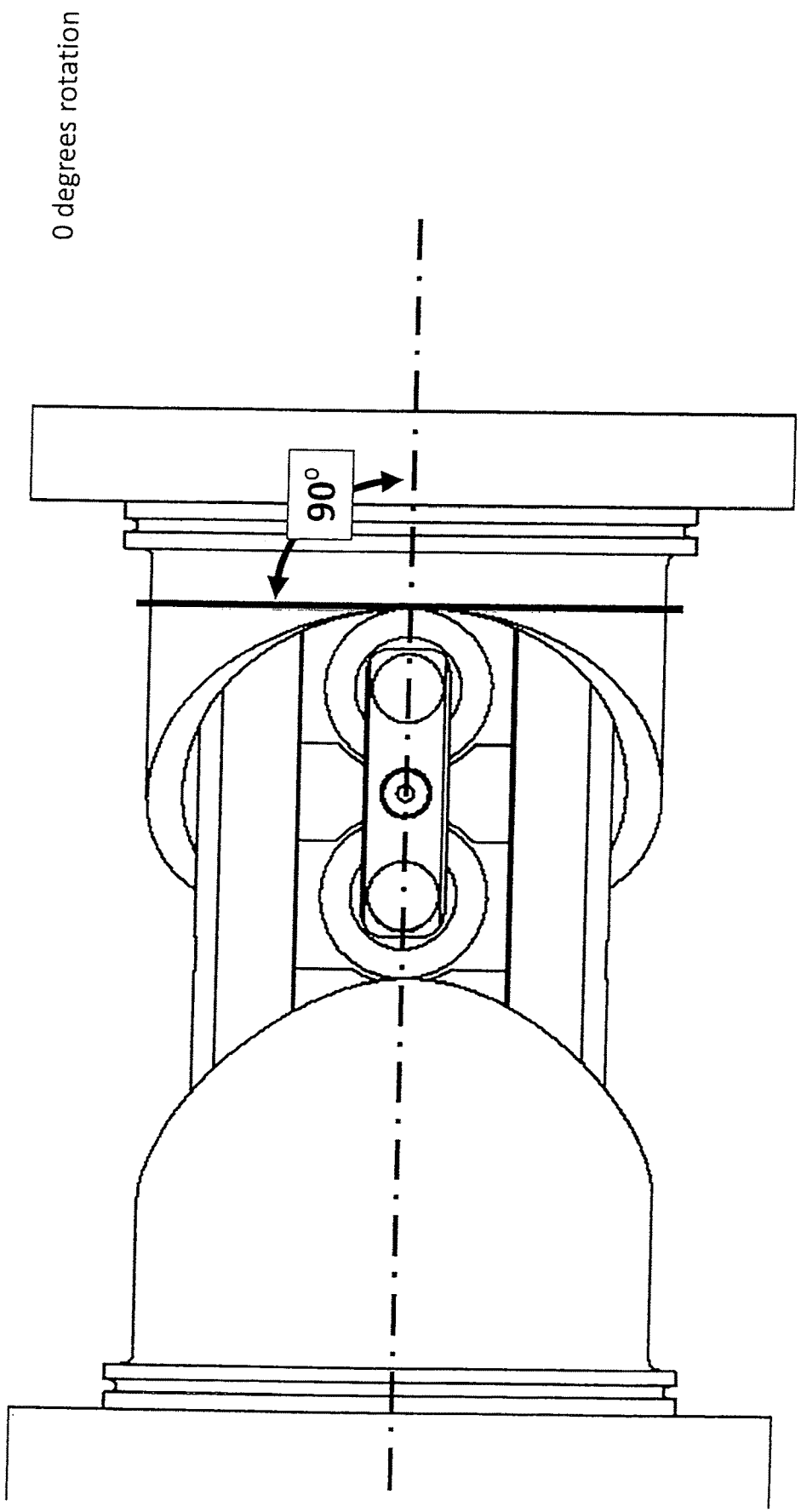
FIG. 23 illustrates the angle between the center line axis of the rotatable track member and the tangent of the track surface at 0° of rotation.
Figure 24:
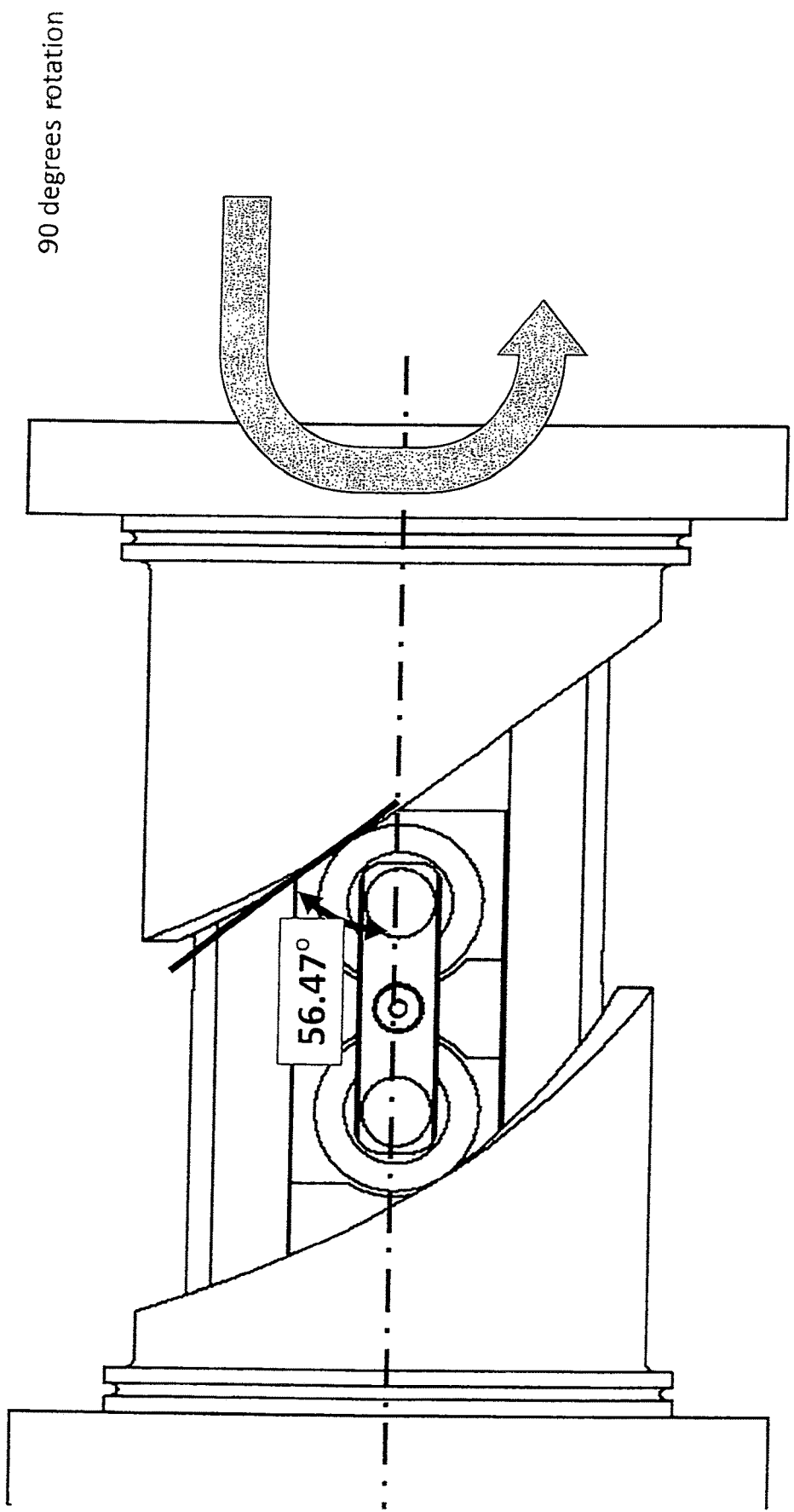
FIG. 24 illustrates the angle between the center line axis of the rotatable track member and the tangent of the track surface at 90° of rotation.
Figure 25:
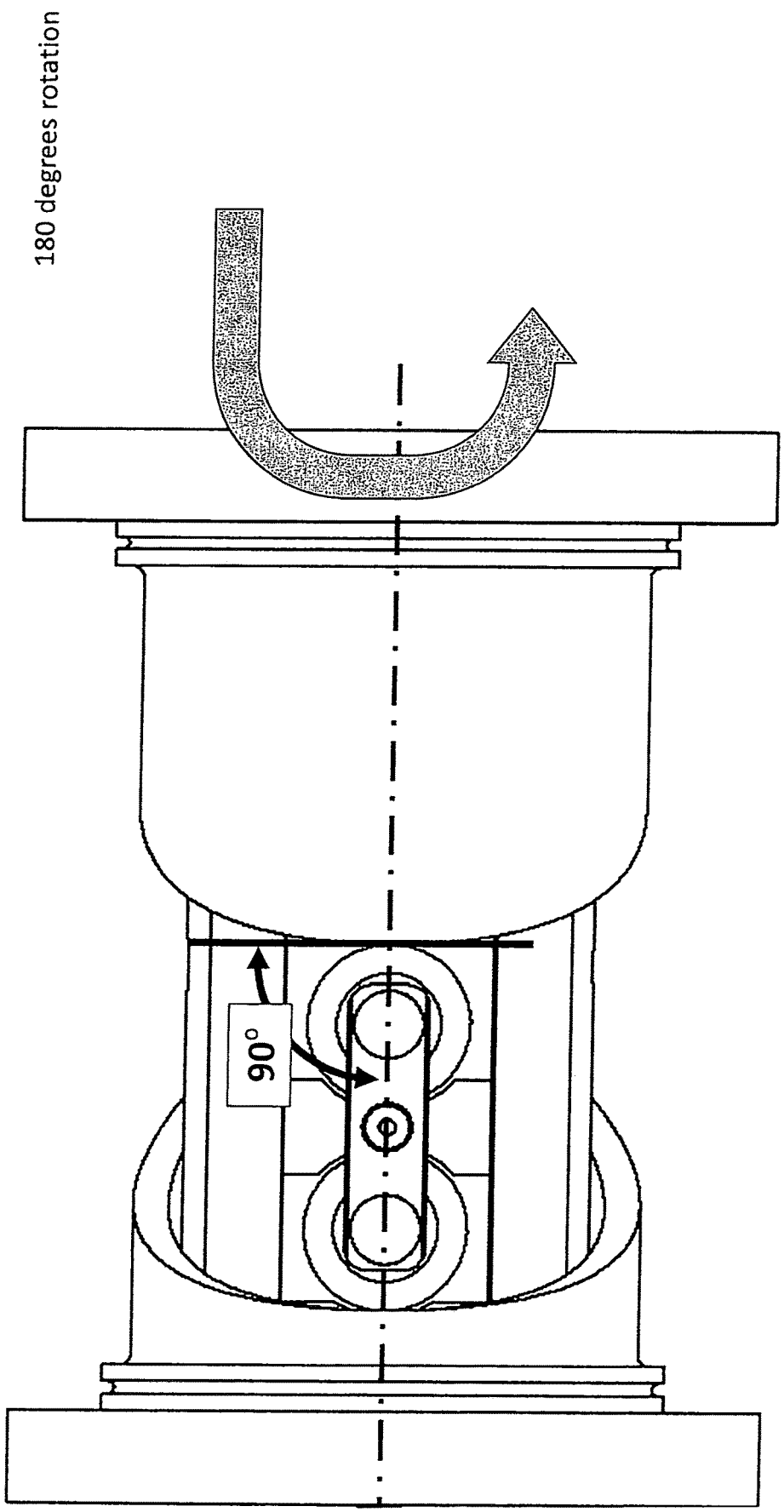
FIG. 25 illustrates the angle between the center line axis of the rotatable track member and the tangent of the track surface at 180° of rotation.

In order to maintain contact between the track surfaces 80 and 82 of the first or proximal track member or portion and the track surfaces 86 and 88 of the second or distal track member or portion of the track 26 with the substantially flat outer surface 42 of each of the substantially circular members 40 of the substantially circular members 40, the tangent of angle of the track surfaces 80/82 and 86/88 relative to the longitudinal or center-line axis changes as illustrated in FIGS. 23 through 25. Specifically, Table II depicts these angles during rotation of the rotatable track member 24.

TABLE II

| Rotatable Track Member Rotation | Center-Line Axis Angle |
| --- | --- |
| 0° | 90° |
| 90° | about 56.47° |
| 180° | 90° |

Figure 8:
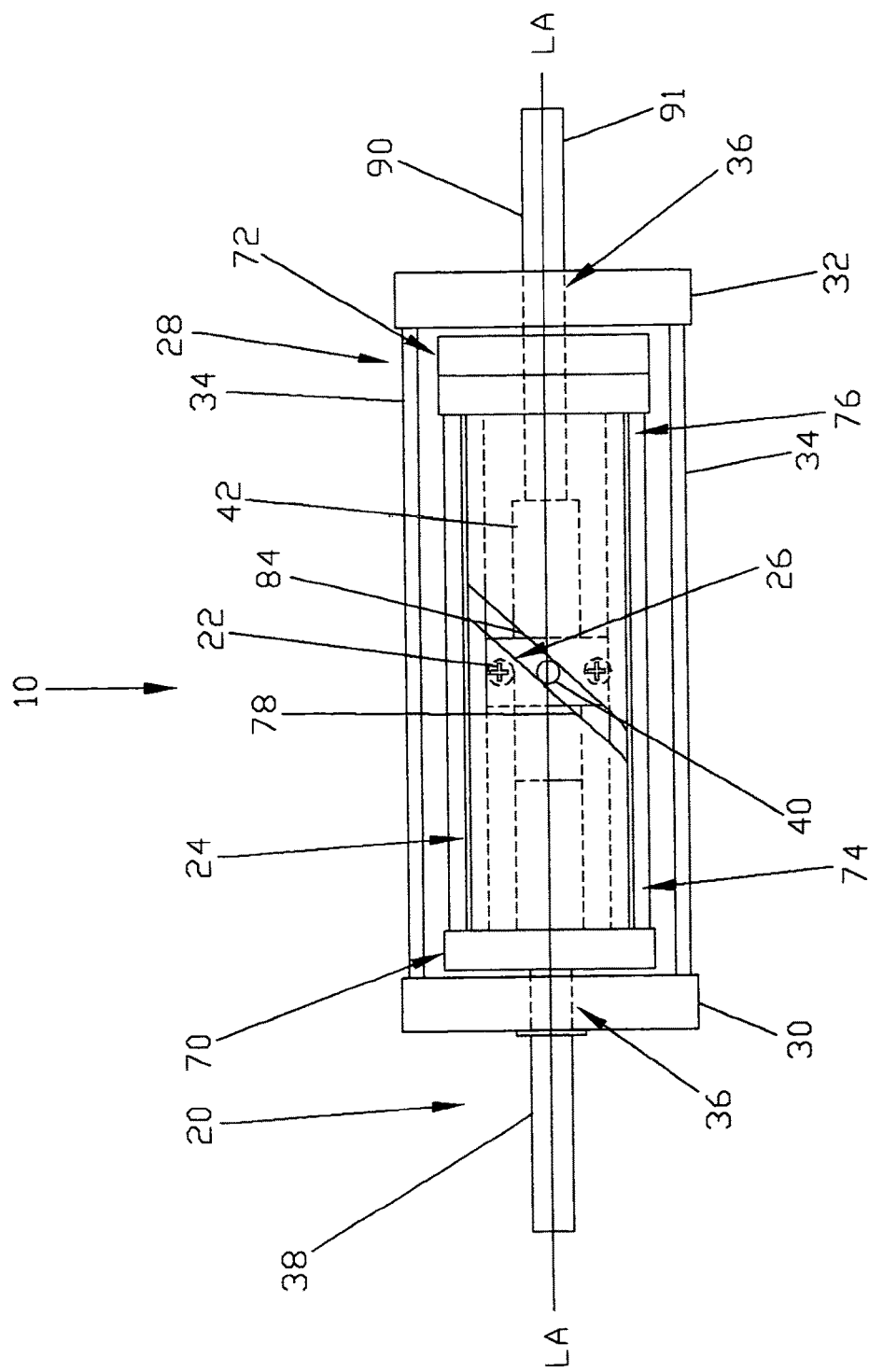
FIG. 8 is another alternate embodiment of the apparatus of the present invention.

The alternate embodiment of the apparatus 10 shown in FIG. 8 is similar to the apparatus 10 depicted in FIG. 1 except that the track drive member 22 comprises a post 40 that moves along the track 26. In describing this alternate embodiment of the apparatus 10 structural elements of FIG.

8, similar structural elements the apparatus 10 of FIG. 1 and FIG. 8 are similarly designated.

As shown in FIG. 8, the apparatus 10 comprises the linear reciprocating member or shaft 20 having a track drive member generally indicated as 22 secured to and extending outwardly therefrom and the rotatable track member generally indicated as 24 having the track generally indicated as 26 formed therein operatively positioned relative to each other on a frame generally indicated as 28.

The frame comprises a first or proximal end plate 30 and second or distal end plate 32 held in spaced relationship relative to each other by at least one stanchion or post 34. Each end plate 30 and 32 includes a central disposed aperture or hole 36 formed therethrough.

The outer end portion 38 of the linear reciprocating member or shaft 20 extends through the central disposed hole 36 formed through the first or proximal end plate 30 and timing device 14 and then coupled to the input device 12. The outer end portion 91 of the rotary shaft 90 extends through the centrally disposed aperture or hole 36 formed through the second or distal end plate 32 and starter unit 18 and then coupled to the output device 18.

The track drive member 22 comprises the post 40 formed on the linear reciprocating member or shaft 20 and disposed to engage opposite sides of the track 26.

Similar to the first embodiment, the rotatable track member 24 is rotatably mounted on the frame 28 by a first or proximal bearing assembly generally indicated as 70 and a second or distal bearing assembly generally indicated as 72. The rotatable track member 24 may comprise a first or proximal track member or portion 74 and a second or distal track member or portion 76 coupled to the first bearing assembly 70 and the second or distal bearing assembly 72. The track 26 comprises a slot having a first track section generally indicated as 78 including a substantially flat first track surface 80 and a substantially flat second track surface 82 formed on the first track member or portion 74 and a second track section generally indicated as 84 including a substantially flat first track surface 86 and a substantially flat second track surface 88 formed on the second track portion 76 as in the first embodiment. The post 40 engages the substantially flat track surfaces 80, 82, 84 or 86 to rotate the rotatable track member 24 as the linear reciprocating member or shaft 20 is cycled in a substantially linear straight path between the proximal end portion and the distal end portion of the apparatus 10 in a substantially linear straight path by the input device 12.

The substantially flat first track surface 80 of the first track section 78 formed on the first track or proximal portion 74 and the substantially flat first track surface 86 of the second track section 84 formed on the second track portion 76 are substantially parallel. Similarly, the substantially flat second track surface 82 of the first track section 78 formed on the first or proximal track portion 74 and the substantially flat second track surface 88 of the second or distal track portion 76 are substantially parallel.

This embodiment includes a pair of transition zones similar to those previously described.

Figure 9:
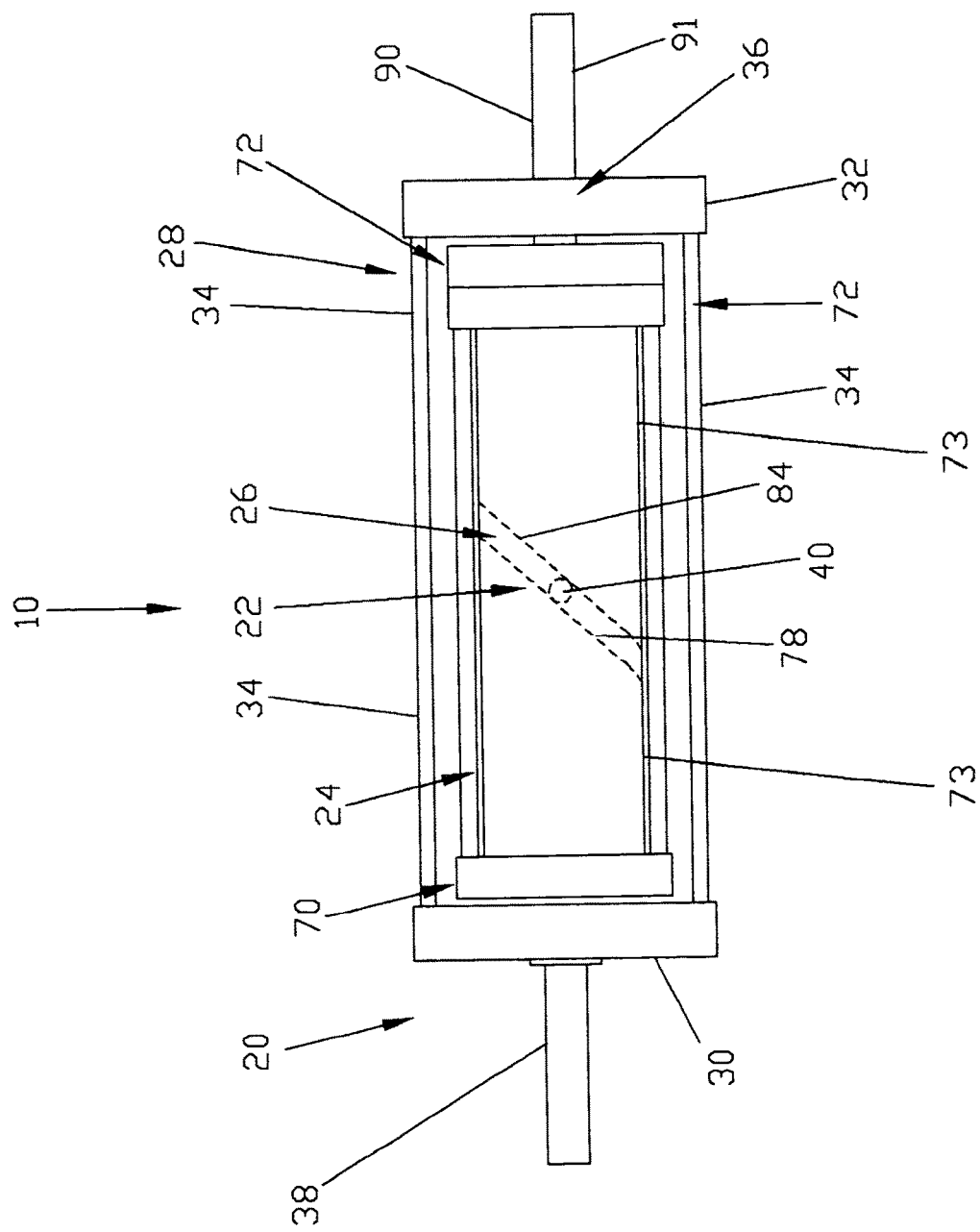
FIG. 9 is yet another alternate embodiment of the apparatus of the present invention.
Figure 10:
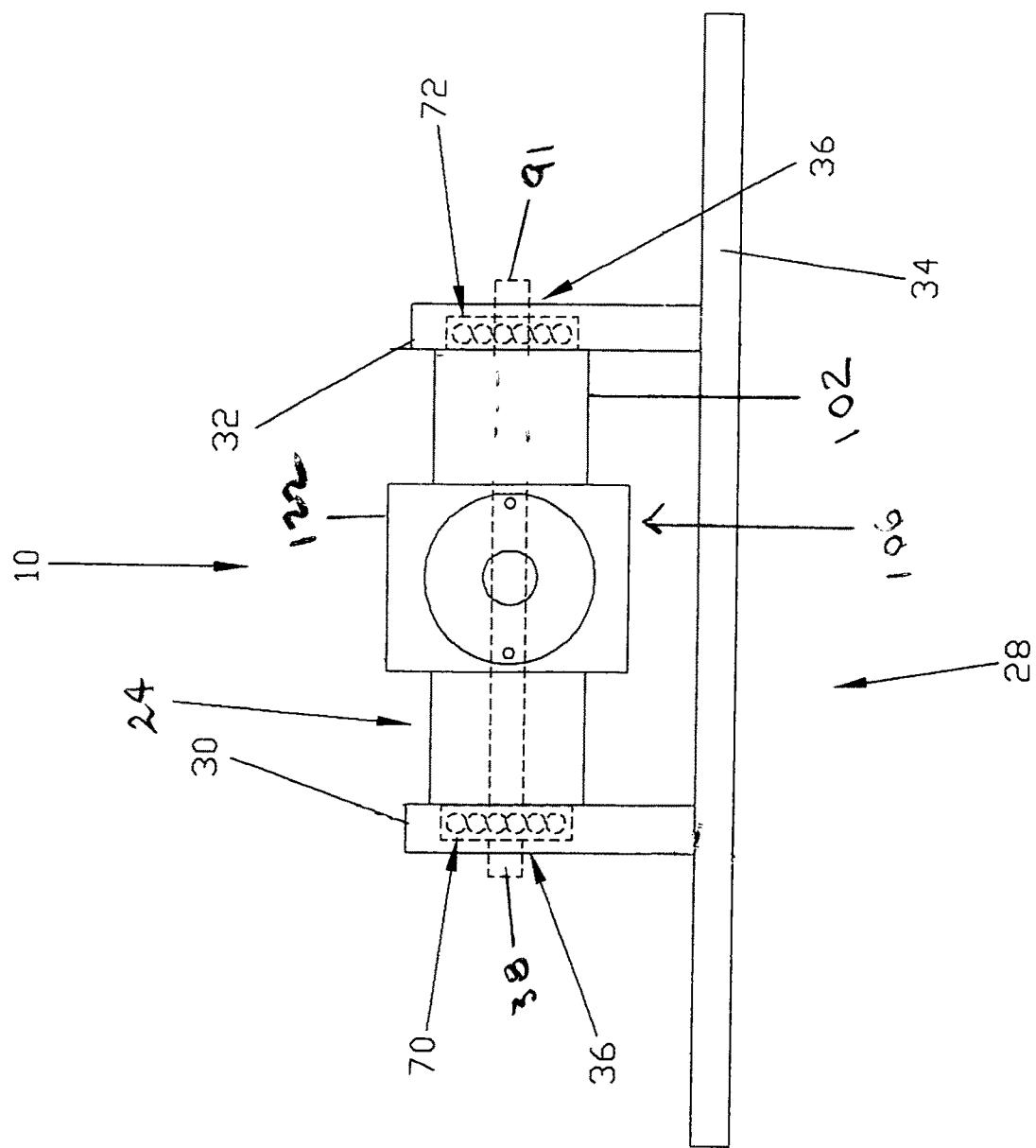
FIG. 10 is a side view of still yet another embodiment of the apparatus of the present invention.
Figure 11:
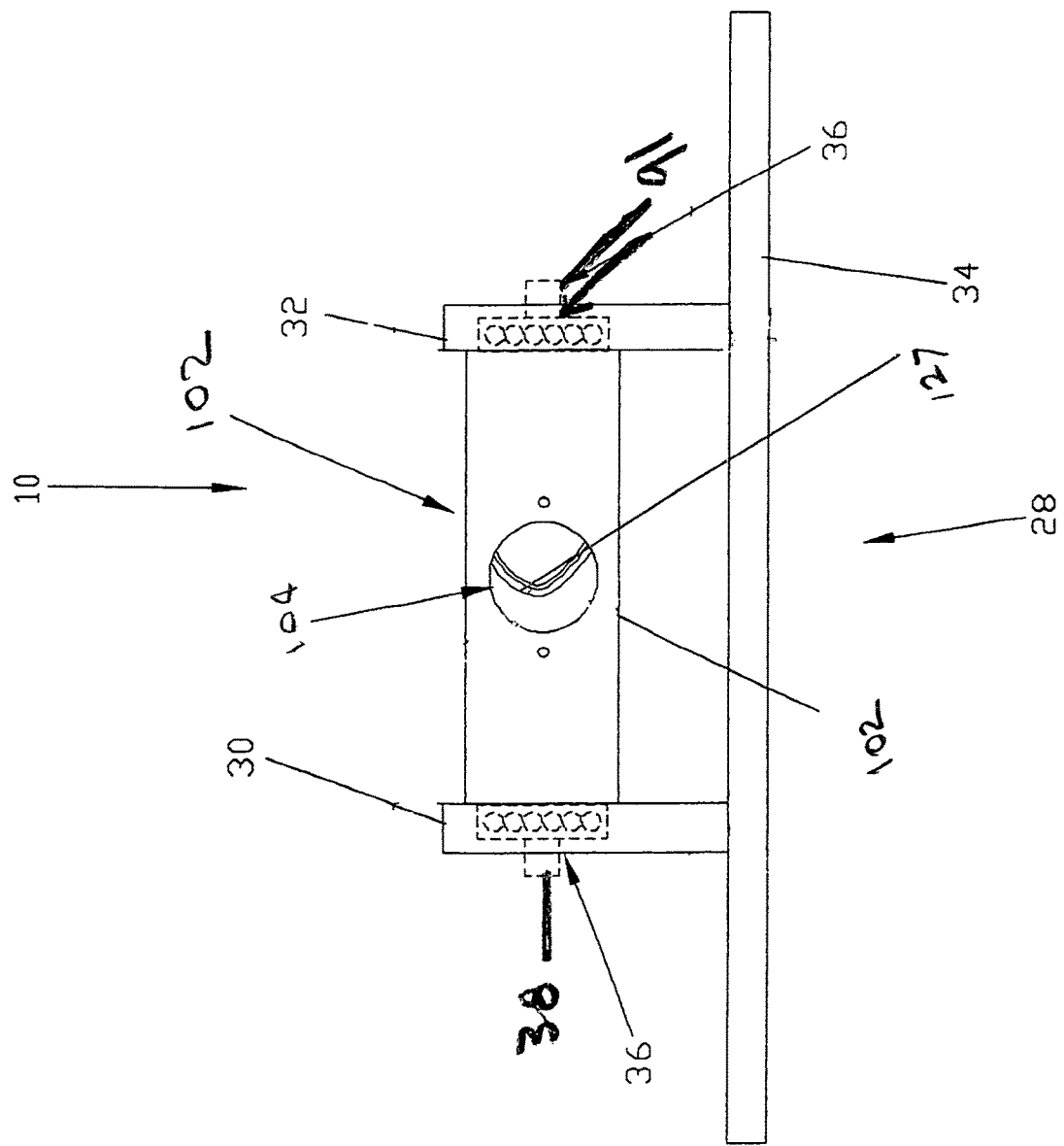
FIG. 11 is a partial side view of the embodiment of the apparatus of the present invention depicted in FIG. 10.
Figure 12:
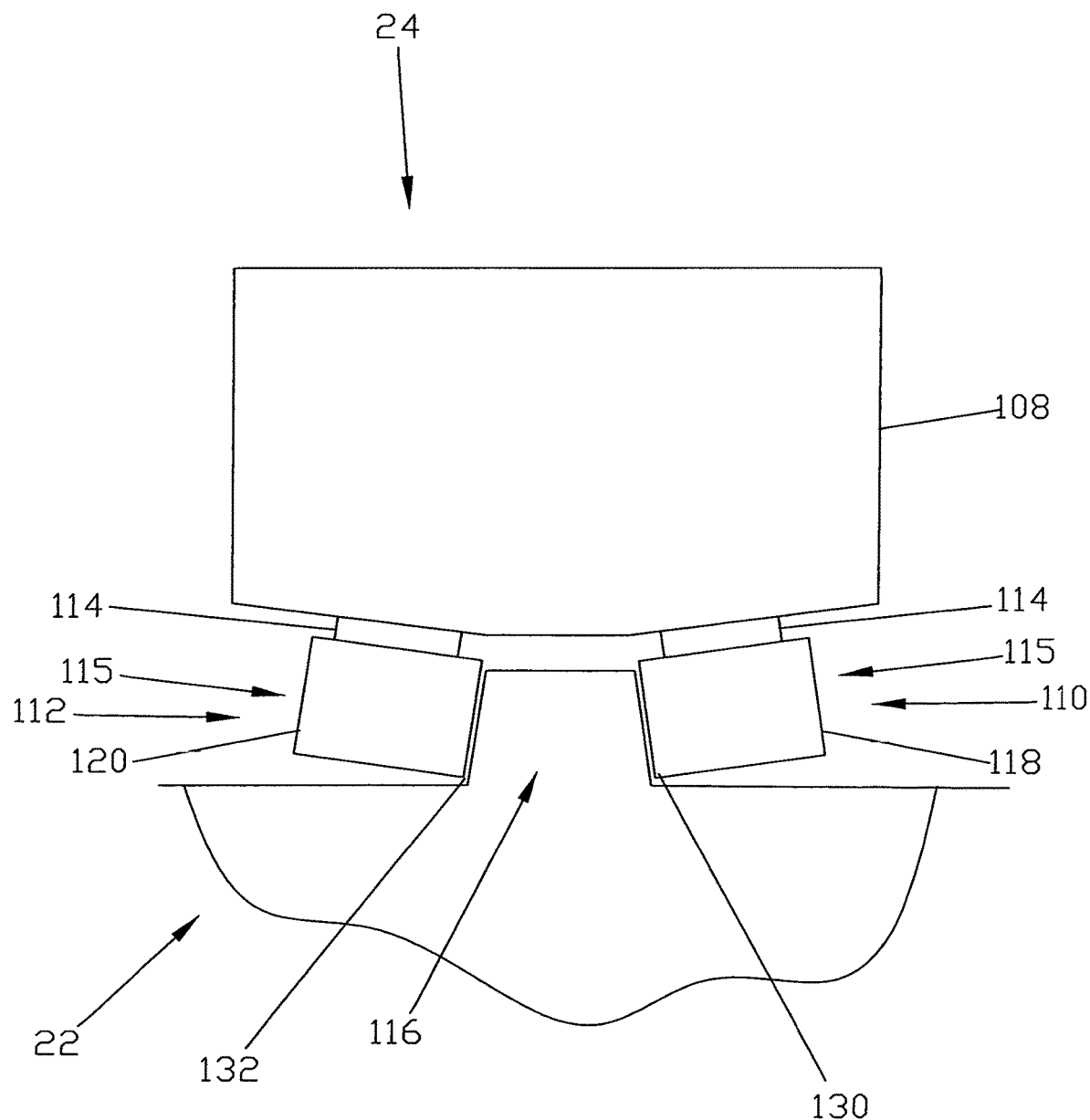
FIG. 12 is a partial end view of the track drive member and track of the embodiment of the present invention depicted in FIG. 10.
Figure 13:
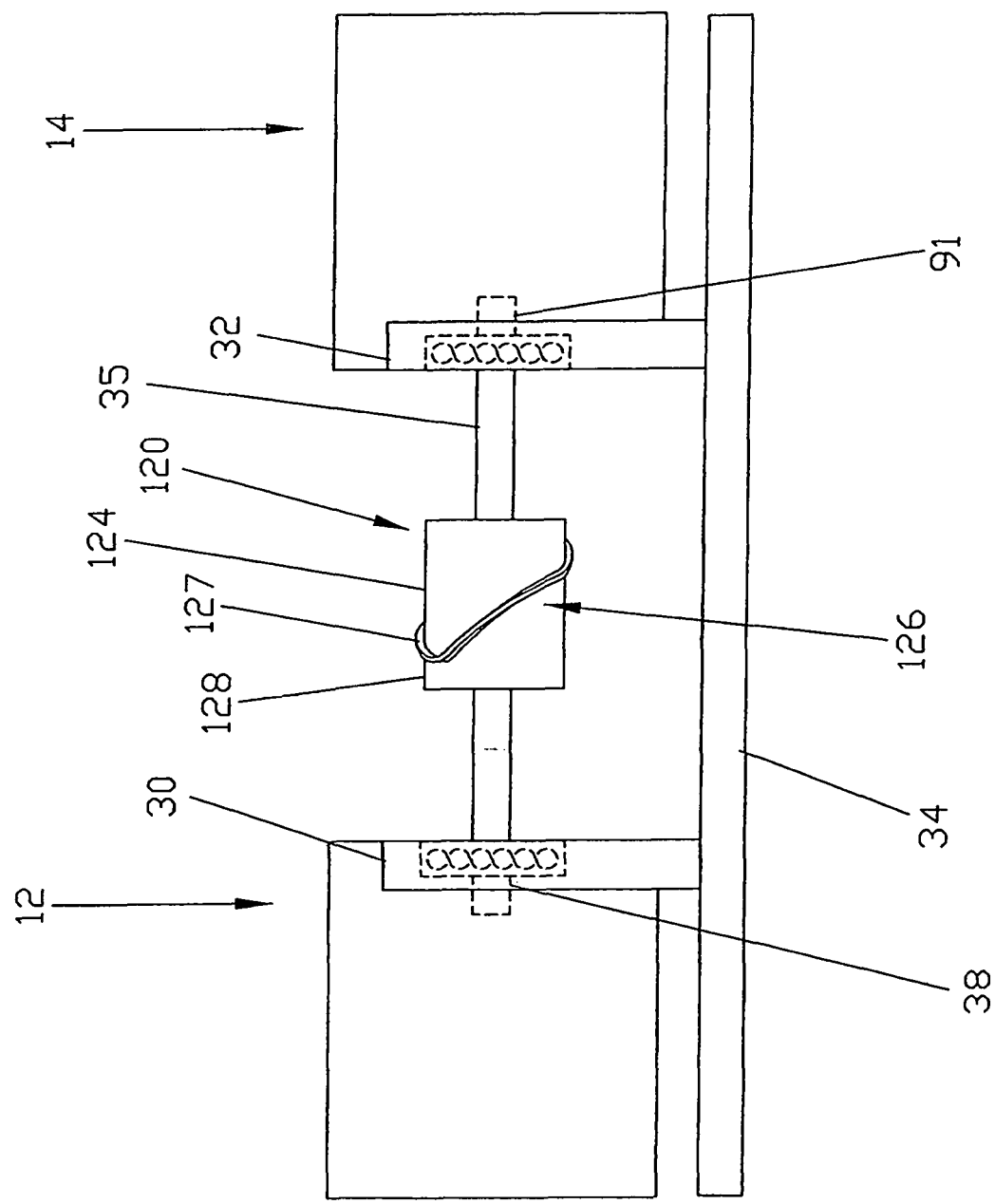
FIG. 13 is a side view of the track drive member of the embodiment of the present invention depicted in FIG. 10.

FIG. 9 discloses an alternate embodiment similar to the embodiment shown in FIG. 8. Specifically, the apparatus 10 comprises the linear reciprocating member or shaft 20 having a track drive member generally indicated as 22 secured to and extending outwardly therefrom and the rotatable track member generally indicated as 24 having the track generally indicated as 26 formed therein operatively positioned relative to each other on a frame.

The frame comprises a first or proximal end plate 30 and second or distal end plate 32 held in spaced relationship relative to each other by at least one stanchion or post 34. Each end plate 30 and 32 includes a central disposed aperture or hole 36 formed therethrough.

The outer end portion 38 of the linear reciprocating member or shaft 20 extends through the central disposed hole 36 formed through the first or proximal end plate 30 and timing device 14 and then coupled to the input device 12. The outer end portion 91 of the rotary shaft 90 extends through the centrally disposed aperture or hole 36 formed through the second or distal end plate 32 and starter unit 18 and then coupled to the output device 18.

As shown in FIG. 9 the track drive member 22 comprises a post 40 formed on linear reciprocating member or shaft 20 disposed to engage opposite sides of the track 26.

Similar to the embodiment depicted in FIG. 7, the rotatable track member 24 is rotatably mounted on the frame by a first or proximal bearing assembly generally indicated as 70 and a second or distal bearing assembly generally indicated as 72. The rotatable track member 24 comprises a substantially cylindrical sleeve 73 coupled to the first bearing assembly 70 and the second or distal bearing assembly 72 respectively to cooperatively form the track 26 therebetween. The track 26 comprises a groove formed on the interior surface of the substantially cylindrical sleeve 73 having a first track section generally indicated as 78 including a substantially flat first track surface 80 and a substantially flat second track surface 82 formed on the first track member or portion 74 and a second track section generally indicated as 84 including a substantially flat first track surface 86 and a substantially flat second track surface 88 formed on the second track portion 76. The post 40 engages the substantially flat track surfaces 80, 82, 84 or 86 to rotate the rotatable track member 24 as the linear reciprocating member or shaft 20 is cycled linearly between the proximal end portions and distal end portion of the apparatus 10 by the input device 12.

The first track surface 80 of the first track section 78 formed on the first track or proximal portion 74 and the first track surface 86 of the second track section 84 formed on the second track portion 76 are substantially parallel. Similarly, the second track surface 82 of the first track section 78 formed on the first or proximal track portion 74 and the second track surface 88 of the second or distal track portion 76 are substantially parallel.

This embodiment includes a pair of transition zones similar to those previously described.

As shown in FIGS. 19 through 22 the linear reciprocating member or shaft 20 comprises a track member drive including a pair of rotating members or bearings disposed to engage the rotatable trac member 24 having the first track surface 80 and track surface 82 of the first track section 78 and the first track surface 86 and second track surface 88 of the second track section 84 formed on opposite ends thereof positioned relative to each other on a frame generally indicated as 28

The acute angle X between the longitudinal axis LA of the hollow substantially cylindrical rotatable sleeve 24 and the center line CL of the track 26 is from about 30 to about 60 but preferably about 45.

Figure 14:
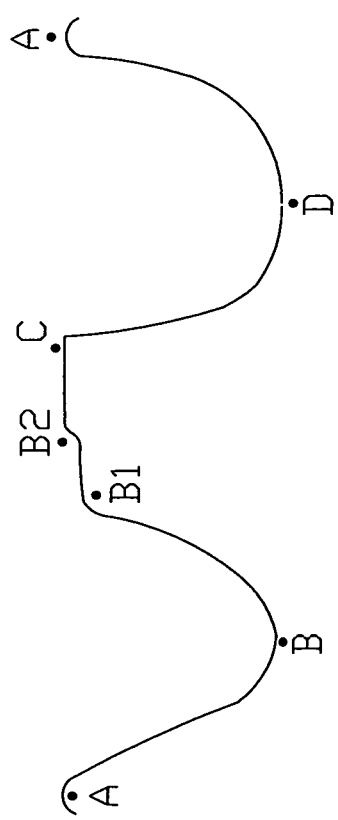
FIG. 14 is a graphic depiction of the track of another alternate embodiment of the present invention.

FIG. 14 graphically depicts the slope(s) of the first and second track sections 78 and 84 of the alternate embodiment of the track drive member and rotatable track member shown in FIGS. 15 through 18 where the substantially parallel track surfaces 80 and 86, and 82 and 88 are asymmetrical in shape such that a four-cycle combustion engine operation; intake, compression, combustion, and exhaust are accomplished, in a single revolution of the rotatable track member 24.

Figure 18:
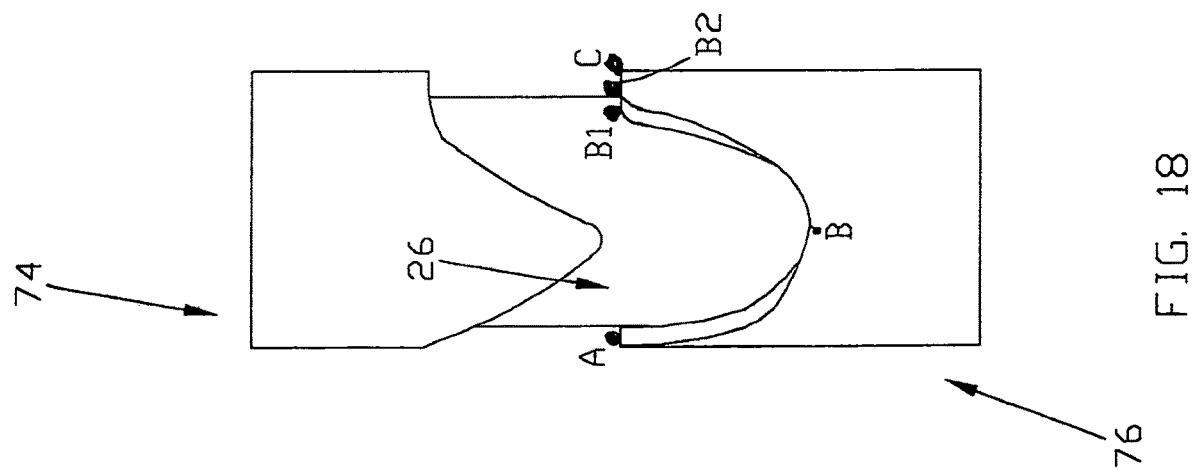
FIG. 18 is a side view of the track drive member and rotatable track member of the alternate embodiment of the present invention graphically depicted in FIG. 14 rotated 270°.
Figure 17:
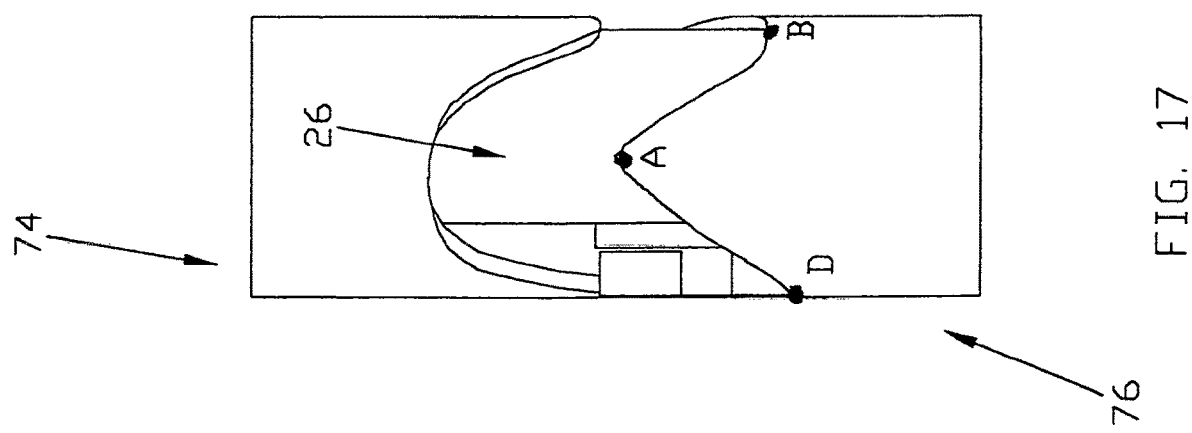
FIG. 17 is a partial side view of the track drive member and rotatable track member of the alternate embodiment of the present invention graphically depicted in FIG. 14 rotated 180°.
Figure 22:
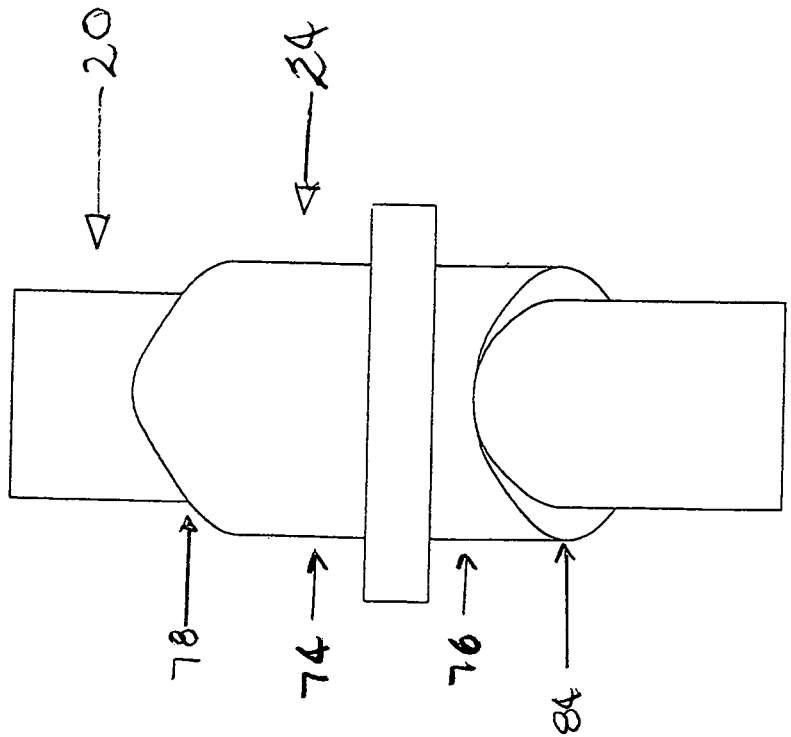
FIG. 22 is a partial side view of the track drive member and rotatable track member of another embodiment of the present invention depicted in FIG. 19 rotated 270°.
Figure 21:
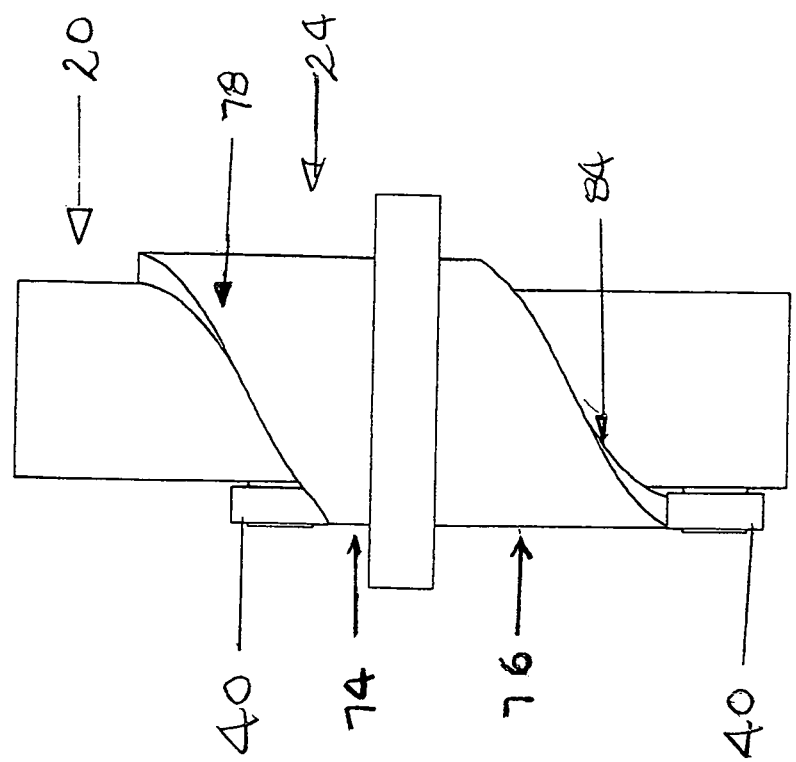
FIG. 21 is a partial side view of the track drive member and rotatable track member of another embodiment of the present invention depicted in FIG. 19 rotated 180°.

The track from A to B represents the intake phase of the combustion cycle (FIGS. 14, 17 and 18). The track of the compression phase comprises three segments: B to B1 as the initial compression phase, B1 to B2 as the cook time compression phase and B2 to C as the final compression phase (FIGS. 14, 15 and 18). The track from C to D represents the combustion phase (FIGS. 14, 15 and 16). The track from C to D represents the combustion phase (FIGS. 14, 15 and 16). The track from D to A represents the exhaust phase (FIGS. 14, 16 and 17) completing the four-cycles of a four-cycle combustion engine 12 completely in a single revolution of the rotatable track member 24.

FIGS. 10 through 13 show yet another embodiment of the apparatus 10.

FIGS. 10 through 13 show another alternate embodiment of the apparatus 10 of the present invention. The rotatable track member 24 is rotatably mounted on the frame 28 by a first or proximal bearing assembly generally indicated as 70 and a second or distal bearing assembly generally indicated as 72 extending between in input device 12 and an output device 16 (FIG. 1). The linear reciprocating member 20 is disposed within the rotatable track member 24.

The frame 28 comprises a first or proximal end plate 30 and a second or distal end plate 32 disposed in spaced relationship on a base 34. A pair of substantially parallel support rods each indicated as 35 extend between the first or proximal end plate 30 and the second or distal end plate 32 to slidingly support the linear reciprocating member 20 as described hereinafter.

The rotatable track member 24 comprises a substantially cylindrical sleeve generally indicated as 102 having a hole 104 formed through the mid-portion thereof to receive the track assembly generally indicated as 106. The track assembly 106 comprises a track mount 108 to operatively support a pair of rotatable track members generally indicated as 110 and 112 attached thereto by a corresponding post 114 to cooperatively form the track 116 therebetween. The track members 110 and 112 each comprises a rotatable substantially cylindrical roller generally indicated as 115. The rotatable substantially cylindrical rollers 115 form the first track surface 118 and second track surface 120. The track assembly 106 is attached to the substantially cylindrical sleeve 102 by a track collar or mount 122 extending around at least a portion of the circumference of the substantially cylindrical sleeve 102 at the mid-portion thereof.

The linear reciprocating member 20 comprises a drive member mount 124 having a track drive member generally indicated as 126 formed on the surface 128 thereof and slidably mounted on the substantially parallel support rods 35. The track drive member 126 comprises a ridge or protrusion 127 including a first track engaging surface 130 and a second track engaging surface 132 disposed within the track 116 to engage the first track surface 118 and second track surface 120 respectively.

The ridge or protrusion 127 is configured substantially the same as the track surfaces 80 and 82 of the first track section 78 and the track surface 88 of the second track section 84 as described with reference to FIGS. 1 through 9 such that as the linear reciprocating member 20 moves linearly back and forth along the substantially parallel support rods 35 the first track engaging surface 130 and the second track engaging surface 132 of the ridges or protrusion 127 engage the first track surface 118 and second track surface 120 respectively rotating the substantially cylindrical sleeve 102 to drive the output shaft 91.

To assemble the apparatus 10, the linear reciprocating member or shaft 20 is coupled to an input device 12 capable of moving the linear reciprocating member or shaft 20 back and forth in a substantially straight path or direction and coupling an output device 16 to the rotatable track member 24 capable of operating the output device 16.

When so assembled, the track drive member 22 engages the track 26 as the linear reciprocating member or shaft 20 moves back and forth in a substantially straight path rotating the rotatable track member 24 converting the linear motion of the input device 12 to the rotary motion of the output device 16.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

In describing the invention, certain terms are used for brevity, clarity, and understanding. No unnecessary limitations should be inferred beyond the requirement of the prior art because such terms are used for descriptive purposes and are intended to be broadly construed. The different structural and functional elements, apparatuses, devices, compositions, and methods described herein may be used alone or in combination with other structural and functional elements, apparatuses, devices, compositions, systems and methods. It is to be expected that various equivalents, alternatives and modifications are possible within the scope of the claims hereinafter.

What is claimed is:

1. An apparatus to convert linear motion to rotary motion comprising a linear reciprocating member drive member to be coupled to an input device and a rotatable track member to be coupled to an output device and including a first track member and a second rotatable track member to cooperatively form a track therebetween wherein said track drive member is disposed to engage said track such that when the input device moves said linear reciprocating member linearly back and forth said track drive member moves along said track to rotate said rotatable track member to convert the linear motion imparted to said linear reciprocating member by the input device to rotary motion of said rotatable track member to operate or drive the output device and wherein said first rotatable track member and said second rotatable track member each includes a first transition zone and a second transition zone formed at intersection of said first track surface and said second track surface of said first track section of said first rotatable track member and at intersection of said first track surface and said second track surface of said second track section of said second rotatable track member respectively, said first transition zone of said first track section and said second transition zone of said second track section are substantially parallel relative to each other and said second transition zone of said first track section and said first transition zone of said second track section are substantially parallel and wherein each said first transition zone comprises a substantially concave track transition zone, each said first transition zone having a center point at which said linear reciprocating member changes direction during operation of said apparatus dividing said concave track transition zones and said corresponding convex transition zones into an exit transition track segment and an entry transition track segment where the velocity of said linear reciprocating member increases when entering said first track section or the second track section from the corresponding exit track transition segment and the velocity of said linear reciprocating member decreases when entering said entry track transition segment of the corresponding track zone.

2. The apparatus of claim 1 wherein said track comprises a slot having a first track section including a first track surface and a second track surface formed on said first track member and a second track section including a first track surface and a second track surface formed on a second track member.

3. The apparatus of claim 2 wherein said track drive member comprises a pair of counter-rotating members including a first substantially round member disposed to engage said first track surface and said second track surface of said first track section and a second substantially round member disposed to engage said first track surface and said second track surface of said second track section to rotate said rotatable track member as said linear reciprocating member is cycled linearly between a proximal end portion and a distal end portion of said apparatus by the input device.

4. The apparatus of claim 2 wherein said first track surface and said second track surface of said first track section comprise a substantially flat first track surface and a substantially flat second track surface respectively and wherein said first track surface and said second track surface of second track section comprise a substantially flat first track surface and a substantially flat second track surface respectively and wherein said first track surface and said second track surface of said first track section of said first rotatable track member intersect at opposite ends thereof and said first track surface and said second track surface of said second track section of said second rotatable track member intersect at opposite ends thereof.

5. The apparatus of claim 4 wherein said substantially flat first track surface of said first track section formed on said first track member and said substantially flat first track surface of said second track section formed on said second track member are substantially parallel and wherein said substantially flat second track surface of said first track section formed on said first track member and said substantially flat second track surface of said second track section formed on said second track member are substantially parallel.

6. The apparatus of claim 1 wherein as said track drive member moves along said track between said substantially concave track transition zones and said corresponding substantially convex track transition zones the linear velocity of said linear reciprocating member is substantially constant.

7. The apparatus of claim 1 wherein said substantially concave track transition zone of said first track member is aligned with adjacent said substantially convex track transition zone of said second track member and said substantially convex track transition zone of said first track member is adjacent said substantially concave track transition zone of said second track member where said center point of corresponding substantially concave track transition zones and said substantially convex track transition zones are axially aligned relative to each other along the longitudinal axis of said rotatable track member.

8. The apparatus of claim 3 wherein said first substantially round member and second substantially round member are disposed in spaced relationship to each other.

9. The apparatus of claim 2 wherein said track drive member comprises a post member extending outwardly from said reciprocating member to engage said track member and said second track member.

10. The apparatus of claim 4 wherein the plane of said substantially flat surfaces of said first track surface and said second track surface of said first track section and said second track section at said intersection of said first track surface and said second track surface of said first track section of said first rotatable track member and said first track surface and said second track surface of said second track section of said second rotatable track member are substantially perpendicular to the longitudinal axis of said rotatable track member and substantially parallel to a surface of said first substantially round member and a surface of said second substantially round member and wherein the angle between said substantially flat surfaces increases between said intersections and said first track sections and said second track sections and decreases between the second track section and said intersection.

11. An apparatus to convert linear motion to rotary motion comprising a linear reciprocating member coupled to an input device and a track drive member affixed to said linear reciprocating member and a rotatable track member including a sleeve having a track formed on an interior surface coupled to an output device wherein said track drive member is disposed within said sleeve to engage said track such that when the input device moves said linear reciprocating member and said track drive member back and forth said track drive member moves along said track to rotate said rotatable track member to convert the linear motion imparted to said linear reciprocating member and said track drive member by the input device to the rotary motion of said rotatable track member to operate or drive the output device.

12. The apparatus of claim 11 wherein said track drive member comprises a pair of counter-rotating members disposed to engage said track to rotate said rotatable track member as said linear reciprocating member is cycled linearly between a proximal end portion and a distal end portion of said apparatus by the input device.

13. The apparatus of claim 12 wherein each said counter-rotating member or bearing rotates in a single direction even as said linear reciprocating member changes direction at the end of each linear stoke between said proximal and distal end portions of said apparatus.

14. The apparatus of claim 11 wherein said track drive member comprises a single rotating member that changes direction of rotation when said linear reciprocating member reverses direction at each end portion of said apparatus.

15. The apparatus of claim 11 wherein said track drive member comprises a post that engages said track.

16. The apparatus of claim 11 wherein said track drive member comprises a post extending outwardly from said linear reciprocating member to engage said track.

17. An apparatus to convert linear motion to rotary motion comprising a linear reciprocating member coupled to an input device and a track drive member affixed to said linear reciprocating member to impart a reciprocating linear motion to said linear reciprocating member and said track drive member, and a rotatable track member including a track coupled to an output device wherein said track drive member is disposed to engage said track such that when the input device moves said track drive member along said track to rotate said rotatable track member to convert the reciprocating linear motion imparted to said linear reciprocating member and said track drive member by the input device to the rotary motion of said rotatable track member to operate or drive the output device, said rotatable track member comprises a sleeve having a hole formed through a mid-portion thereof to receive a portion of said track assembly, said track assembly comprises a track mount to operatively support a pair of rotatable track members comprising a first track surface and a second track surface to cooperatively form said track therebetween, said track assembly further comprises a drive assembly comprising a drive member mount having said track drive member formed on the surface thereof and slidably mounted on at least one support rod.

18. The apparatus of claim 17 wherein said track drive member comprises a protrusion including a first track engaging surface and a second track engaging surface disposed within said track to engage a first track surface and second track surface respectively.

19. The apparatus of claim 17 wherein each said rotatable track member comprises a rotatable roller.

20. The apparatus of claim 17 wherein said track assembly is attached to said sleeve by a track collar extending around at least a portion of the circumference of said sleeve at said mid-portion thereto.

21. An apparatus to convert linear motion to rotary motion for use with a four cycle internal combustion engine, said apparatus comprising a linear reciprocating member having a track drive member affixed thereto and coupled to the four cycle internal combustion engine to extend and retract said linear reciprocating member and track drive member, and a rotatable track member coupled to an output device and including a track to engage said track drive member, said track comprising a plurality of slopes to control the linear extension and retraction of said linear reciprocation member and said track drive member, said plurality of slopes including a substantially arcuate slope corresponding to the intake phase and the initial compression phase transitioning to a substantially flat slope corresponding to the cook time compression phase and transitioning to a second substantially flat slope corresponding to the final compression phase and transitioning to a substantially arcuate slope corresponding to the combustion phase and exhaust phase to complete the four cycle operation wherein said slopes control the extension and retraction of said linear reciprocating member and said track drive member such that when the input device extends and retracts said linear reciprocating member and said track drive member said track drive member moves along said slopes of said track to rotate said rotatable track member as four cycle internal combustion engine drives said output device.

22. The apparatus of claim 21 wherein said track drive member comprises a pair of counter-rotating members disposed to engage opposite sides of said track to rotate said rotatable track member as said linear reciprocating member is cycled linearly between a proximal end portion and a distal end portion of said apparatus by the input device.

\* \* \* \* \*